(12) United States Patent
Jamali et al.

(10) Patent No.: US 11,175,508 B2
(45) Date of Patent: Nov. 16, 2021

(54) DISPLAY DEVICE WITH VARIFOCAL OPTICAL ASSEMBLY

(71) Applicant: Facebook Technologies, LLC, Menlo Park, CA (US)

(72) Inventors: Afsoon Jamali, Redmond, WA (US); Wai Sze Tiffany Lam, Vancouver (CA); Brian Wheelwright, Sammamish, WA (US); Lu Lu, Kirkland, WA (US); Douglas Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 108 days.

(21) Appl. No.: 16/355,612

(22) Filed: Mar. 15, 2019

(65) Prior Publication Data

US 2020/0081315 A1   Mar. 12, 2020

Related U.S. Application Data

(60) Provisional application No. 62/643,691, filed on Mar. 15, 2018, provisional application No. 62/772,598, filed on Nov. 28, 2018.

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1828* (2013.01); *G02B 5/1842* (2013.01);
(Continued)

(58) Field of Classification Search
CPC .......... G02B 27/0172; G02B 5/1828; G02B 5/1842; G02B 5/3083; G02B 26/106;
(Continued)

(56) References Cited

U.S. PATENT DOCUMENTS

| 7,397,525 B2 | 7/2008 | Tago et al. |
| 9,335,548 B1 | 5/2016 | Cakmakci et al. |

(Continued)

FOREIGN PATENT DOCUMENTS

| EP | 3351978 A1 | 7/2018 |
| WO | WO/01/09685 A1 | 2/2001 |

(Continued)

OTHER PUBLICATIONS

AlphaMicron—The World's Fastest Tint-Changing Technology, http://alphamicron.com/, retrieved Feb. 28, 2020, 4 pages.

(Continued)

*Primary Examiner* — Mohammed A Hasan
(74) *Attorney, Agent, or Firm* — Morgan, Lewis & Bockius LLP

(57) ABSTRACT

A varifocal optical assembly includes a plurality of optical elements configured to transmit light in successive optical stages. Each respective optical stage of the successive optical stages includes at least one respective optical element of the plurality of optical elements and is configurable to be in one of a first state and a second state. The respective optical stage in the first state has a first respective optical power for light of a first polarization and a second respective optical power for light of a second polarization. The respective optical stage in the second state has a third optical power for light of the first polarization and a fourth optical power for light of the second polarization. The optical power of varifocal optical assembly is adjustable by changing the states of one or more of the successive optical stages.

20 Claims, 21 Drawing Sheets

(51) Int. Cl.
*G02B 5/30* (2006.01)
*G02B 26/10* (2006.01)
*G02B 27/00* (2006.01)
*G02F 1/29* (2006.01)

(52) U.S. Cl.
CPC ......... *G02B 5/3083* (2013.01); *G02B 26/106* (2013.01); *G02B 27/0093* (2013.01); *G02F 1/29* (2013.01); *G02B 2027/0123* (2013.01); *G02B 2027/0178* (2013.01); *G02F 1/294* (2021.01); *G02F 2203/07* (2013.01)

(58) Field of Classification Search
CPC ........ G02B 27/0093; G02B 2027/0123; G02B 2027/0178; G02B 5/30; G02B 2027/0127; G02B 2027/0132; G02B 27/0179; G02B 27/286; G02B 2027/0187; G02B 26/0808; G02F 1/29; G02F 2001/294; G02F 2203/07; G02F 1/0136
USPC ......................................................... 359/303
See application file for complete search history.

(56) References Cited

U.S. PATENT DOCUMENTS

| | | | |
|---|---|---|---|
| 9,976,911 | B1 | 5/2018 | Tabirian et al. |
| 10,120,193 | B2 | 11/2018 | Lam |
| 10,151,961 | B2 | 12/2018 | Lu et al. |
| 10,451,947 | B1 | 10/2019 | Lu et al. |
| 10,539,829 | B1 | 1/2020 | Lu et al. |
| 10,546,430 | B1 | 1/2020 | Lu et al. |
| 2007/0258029 | A1 | 11/2007 | Nakagawa et al. |
| 2012/0188467 | A1 | 7/2012 | Escuti et al. |
| 2016/0047956 | A1* | 2/2016 | Tabirian ................ G02B 5/001 385/11 |
| 2017/0010488 | A1 | 1/2017 | Klug et al. |
| 2017/0115491 | A1 | 4/2017 | Jianru |
| 2018/0129018 | A1 | 5/2018 | Cheng et al. |
| 2018/0210222 | A1 | 7/2018 | Seo et al. |
| 2018/0239177 | A1 | 8/2018 | Oh |
| 2018/0275410 | A1 | 9/2018 | Yeoh et al. |
| 2018/0284464 | A1* | 10/2018 | Lu .................... G02B 27/0093 |
| 2018/0292653 | A1 | 10/2018 | Tervo |
| 2019/0075281 | A1 | 3/2019 | Hall et al. |
| 2019/0124152 | A1* | 4/2019 | Iasi .................... H04L 67/1097 |
| 2020/0249626 | A1 | 8/2020 | Bouchal et al. |

FOREIGN PATENT DOCUMENTS

| | | |
|---|---|---|
| WO | WO2008/004692 A1 | 1/2008 |
| WO | WO2011/014743 A2 | 2/2011 |
| WO | WO2016/154537 A1 | 9/2016 |
| WO | WO2018/231784 A1 | 12/2018 |

OTHER PUBLICATIONS

C. Yousefzadeh, Afsoon Jamali, et. al. "Achromatic limits" of Pancharatnam Phase Lenses, Applied Optics 57(5) ,2018.
Caputo et al. "POLICRYPS Composite Materials: Features and Applications", In Advances in Composite Materials—l\nalysis of Natural and Man-Made Materials, Pavia Tesinova ed., 2011, DOI: 10.5772/17137, available at https://lwww.ntechopen.com/books/advances-in-composite-materials-analysis-of-natural-and-man-made-materials/policryps-composite-materials-features-and-applications, 28 pages.
Cheng et al., "Concept for a transmissive, large angle, light steering device with high efficiency", vol. 40, Issue 9, pp. hllps://doi.org/10.1364/0L.40.002080, May 1, 2015, pp. 2080-2083.
Crawford, Gregory P. "Electrically Switchable BRAGG GRATINGS", Optics & Pholonics News, Apr. 2003, pp. 54-59.
Doane, William J., "Polymer-Dispersed Liquid Crystals: Boojums at Work." MRS Bulletin, vol. 16, Jan. 1991, 10.1557/S0883769400057869, pp. 22-28.
Facebook Technologies LLC, International Search Report and Written Opinion, PCT/US2019/062751, dated Feb. 12, 2020, 13 pgs.
Facebook Technologies LLC, International Search Report and Written Opinion, PCT/US2019/063552, dated Mar. 6, 2020, 10 pgs.
Gao et al., "High-efficiency large-angle Pancharalnam phase deflector based on dual-twist design", vol. 25, Issue 6, nttps://doi.org/10.1364/0E.25.006283, Mar. 20, 2017, pp. 6283-6293.
Geometric Phase Lenses with Color Selective Fillers {"GPL+CS"), lmagineOptix, Available at hllps://www. magineoptix.com/coming-soon-chromalic-aberralion-correction-geomelric-phase-lenses-red-green-blue-operalion/, May 2, 2017, 3 pages.
Guanjun Tan et al., "Foveated imaging for near-eye displays," Optics Express, vol. 26, No. 19, Sep. 11, 2018, p. 25076, XP055525627, DOI: 10.1364/0E.26.025076.
Lam, Office Action, U.S. Appl. No. 16/006,706, dated Jun. 12, 2020, 12 pgs.
Liu et al., "Generation of perfect vortex and vector beams based on Pancharalnam-Berry phase elements," Mar. 9, J017, Nature, www.nature.com/scienlificreports, 8 pages.
Liu et al., "Holographic Polymer-Dispersed Liquid Crystals: Materials, Formation, and Applications," Advances in OptoElectronics, vol. 2008, Article ID 684349, 2008, doi:10.1155/2008/684349, 53 pages.
Lin et al., "Retinal projection head-mounted display", hllps://link.springer.com/article/10.1007/s12200-016-0662-8, Oct. 15, 2016, 8 pages.
Maimone et al., "Holographic near-eye displays for virtual and augmented reality", ACM Transactions on Graphics, vol. 36, No. 4, Article 85, Jul. 2017, 16 pages.
McManamon et al., "A Review of Phased Array Steering for Narrow-Band Electrooptical System", Proceeding of EEE, vol. 97, No. 6, Jun. 2009, pp. 1078-1096.
Moheghi, Alireza "Le/Polymer Composites, Scattering Properties and Application in Displays", PhD dissertation, Ken State University, May 2017, 130 pages.
Shen S, She J, Tao T., "Optimal design of achromatic true zero-order waveplates using twisted nematic liquid crystal", J Opt Soc Am A Opt Image Sci Vis. May 2005;22(5):961-5.).
Soto, Pedro Coutino," Modeling and Characterization of Dye-Doped Guest-Host Liquid Crystal Eyewear", PhD dissertation, Kent State University, Nov. 2015, 149 pages.
Tae-Hoon Yoon, Gi-Dong Lee, and Jae Chang Kim, "Nontwist quarter-wave liquid-crystal cell for a high-contrast reflective display," Opt. Lett. 25, 1547-1549 (2000).
Tao Zhan et al., "High-resolution additive light field near-eye display by switchable Pancharatnam-Berry phase lenses", Optics Express, vol. 26, No. 4, Feb. 15, 2018 (Feb. 15, 2018), p. 4863, DOI: 10.1364/0E. 26.004863.
Uchiyama and T. Yatabe, "Wide-band retardation films with reverse wavelength dispersion," in Proceedings of the 7th International Display Workshop (Society for Information Display, 2000), pp. 407-410.—I haven't been able to obtain this reference yet.
Wang et al., "Finite Difference Time-Domain Simulation of a Liquid Crystal Optical Phased Array", Journal of the Optical Society of America, vol. 22, No. 2, Feb. 2005, pp. 346-354.
Yachao Liu, Yougang Ke, Junxiao Zhou, Yuanyuan Liu, Hailu Luo, Shuangchun Wen & Dianyuan Fan, "Generation of perfect vortex and vector beams based on Pancharatnam-Berry phase elements," Mar. 9, 2017, Nature.
Jamali, Office Action, U.S. Appl. No. 16/273,021, dated Oct. 16, 2020, 18 pgs.
Shibata et al. "The zone of comfort: Predicting visual discomfort with stereo displays". Journal of Vision, 2011, 53 pages.
Liu et al., "Generation of perfect vortex and vector beams based on Pancharatnam-Berry phase elements," Mar. 9, 2017, Nature, www.nature.com/scientificreports, 8 pages.
Jamali, Notice of Allowance, U.S. Appl. No. 16/273,021, dated Apr. 13, 2021, 9 pgs.
Lam, Office Action, U.S. Appl. No. 16/006,706, dated Feb. 5, 2021, 16 pgs.
Lam, Office Action, U.S. Appl. No. 16/006,701, dated Jan. 11, 2021, 12 pgs.

(56) References Cited

OTHER PUBLICATIONS

Anonymous: Geometric Phase Lenses with Color Selective Filters ("GPL+CS"), ImagineOPtix, May 2, 2017, downloaded from https://imagineoptix.com/coming-soon-chromatic-aberration-correction-geometric-phase-lenses-red-green-blue-operation, 3 pgs.
Facebook Technologies LLC, International Search Report and Written Opinion, PCT/US2019/022334, dated May 31, 2019, 11 pgs.
Facebook Technologies LLC, International Preliminary Report on Patentability, PCT/US2019/022334, dated Sep. 15, 2020, 7 pgs.
Facebook Technologies LLC, International Search Report and Written Opinion, PCT/US2019/022147, dated Jun. 3, 2019, 11 pgs.
Facebook Technologies LLC, International Preliminary Report on Patentability, PCT/US2019/022147, dated Sep. 15, 2020, 7 pgs.

* cited by examiner

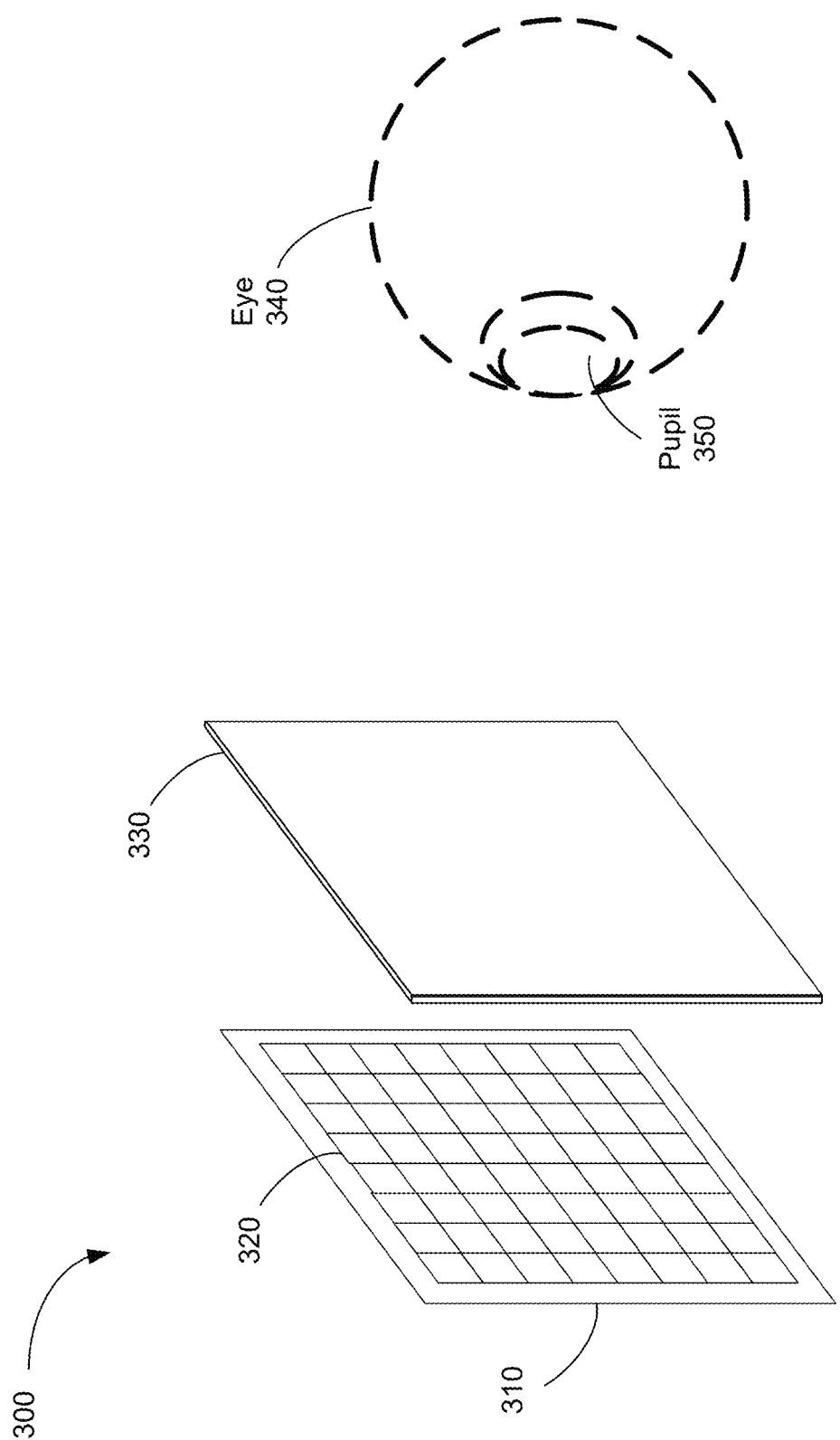

770

| State # | Lens+display | In | LC1 | ±1D | LC2 | ±0.5D | LC3 | ±.25D | Out | LC4 | Resulting Power | CP |
|---|---|---|---|---|---|---|---|---|---|---|---|---|
| 1 | -.25 D obj | RCP | OFF | +1D | ON | -.5D | OFF | -.25D | LCP | OFF | 0 D | RCP |
| 2 | -.25 D obj | RCP | ON | -1D | ON | +.5D | OFF | +.25D | RCP | ON | -0.5 D | RCP |
| 3 | -.25 D obj | RCP | ON | -1D | ON | +.5D | ON | -.25D | LCP | OFF | -1 D | RCP |
| 4 | -.25 D obj | RCP | ON | -1D | OFF | -.5D | ON | +.25D | RCP | ON | -1.5 D | RCP |
| 5 | -.25 D obj | RCP | ON | -1D | OFF | -.5D | OFF | -.25D | LCP | OFF | -2 D | RCP |

| State# | Lens+display | In | LC1 | ±1D | LC2 | ±0.5D | LC3 | ±.25D | Out | LC4 | Resulting Power | CP |
|---|---|---|---|---|---|---|---|---|---|---|---|---|
| 1 | -.25 D obj | LCP | ON | +1D | ON | -.5D | OFF | -.25D | LHC | OFF | 0 D | RCP |
| 2 | -.25 D obj | LCP | OFF | -1D | ON | +.5D | OFF | +.25D | RHC | ON | -0.5 D | RCP |
| 3 | -.25 D obj | LCP | OFF | -1D | ON | +.5D | ON | -.25D | LHC | OFF | -1 D | RCP |
| 4 | -.25 D obj | LCP | OFF | -1D | OFF | -.5D | ON | +.25D | RHC | ON | -1.5 D | RCP |
| 5 | -.25 D obj | LCP | OFF | -1D | OFF | -.5D | OFF | -.25D | LHC | OFF | -2 D | RCP |

Figure 7C

DISPLAY DEVICE WITH VARIFOCAL OPTICAL ASSEMBLY

RELATED APPLICATIONS

This application claims the benefit of, and priority to, U.S. Provisional Patent Application Ser. No. 62/643,691, filed Mar. 15, 2018 and U.S. Provisional Patent Application Ser. No. 62/772,598, filed Nov. 28, 2018. Both of these applications are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, head-mounted displays are used for virtual reality and augmented reality operations. A head-mounted display often includes an electronic image source and an optical assembly.

When viewing objects at different distances, the fixation point of the eyes (vergence) and the focal distance (accommodation) are normally coupled. Accommodation is driven by retinal blur and is associated with the distance at which the eye focuses. Vergence is driven by binocular image disparity and is related to the fixation point of the eyes of a user. When displaying three-dimensional images in a near-eye display or a head-mounted display, the focal distance is typically fixed by the configuration of the image source and the optical assembly. Thus, when objects are simulated in three-dimensions as being at various distances from the user, the fixation point of the eyes (vergence) will adjust to view the displayed object, yet the focal distance (accommodation) remains fixed, leading to decoupling of vergence and accommodation, also known as vergence-accommodation conflict.

SUMMARY

In accordance with some embodiments, an optical assembly includes a plurality of optical elements configured to transmit light in successive optical stages. Each respective optical stage of the successive optical stages includes at least one respective optical element of the plurality of optical elements and configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization. An overall optical power of the optical assembly is variable by configuring one or more of the successive optical stages.

In some embodiments, one or more optical stages of the successive optical stages includes an optical element of a first type and an optical element of a second type. The optical element of the first type is configurable to be in an "off" state or an "on" state. In the "off" state, the optical element of the first type converts light of the first or second polarization into light of the second or first polarization, respectively. In the "on" state, the optical element of the first type transmits incident light without changing its polarization. The optical element of the second type is configured to receive light transmitted through the optical element of the first type and has an optical power that is dependent on whether the light transmitted through the optical element of the first type has the first polarization or the second polarization.

In some embodiments, one or more optical stages of the successive optical stages include an active optical element. The active optical element is configurable to be in an "off" state or an "on" state. In the "off" state, the active optical element has an optical power that is dependent on whether light incident on the active optical element has the first polarization or the second polarization. In the "on" state, the active optical element transmits the incident light without changing its polarization or direction.

In accordance with some embodiments, a display device includes a display configured to emit image light and an optical assembly configured to transmit the image light emitted from the display. The optical assembly includes a plurality of optical elements configured to transmit light in successive optical stages. Each respective optical stage of the successive optical stages includes at least one respective optical element of the plurality of optical elements and configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization. An overall optical power of the optical assembly is variable by configuring one or more of the successive optical stages.

In accordance with some embodiments, a method includes transmitting light through an optical stack having a plurality of stages and adjusting a focal length of the optical stack by changing respective states of one or more optical stages of the plurality of optical stages. Each stage of the plurality of optical stages is configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization.

Thus, the disclosed embodiments provide display devices with adjustable optical power to decrease eye fatigue and improve user comfort and satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures. The figures are not drawn to scale unless indicated otherwise.

FIG. 3A is an isometric view of a display device in accordance with some embodiments.

FIGS. 7B-7C show examples of different configurations of a varifocal optical assembly in accordance with some embodiments.

DETAILED DESCRIPTION

Figure 1:
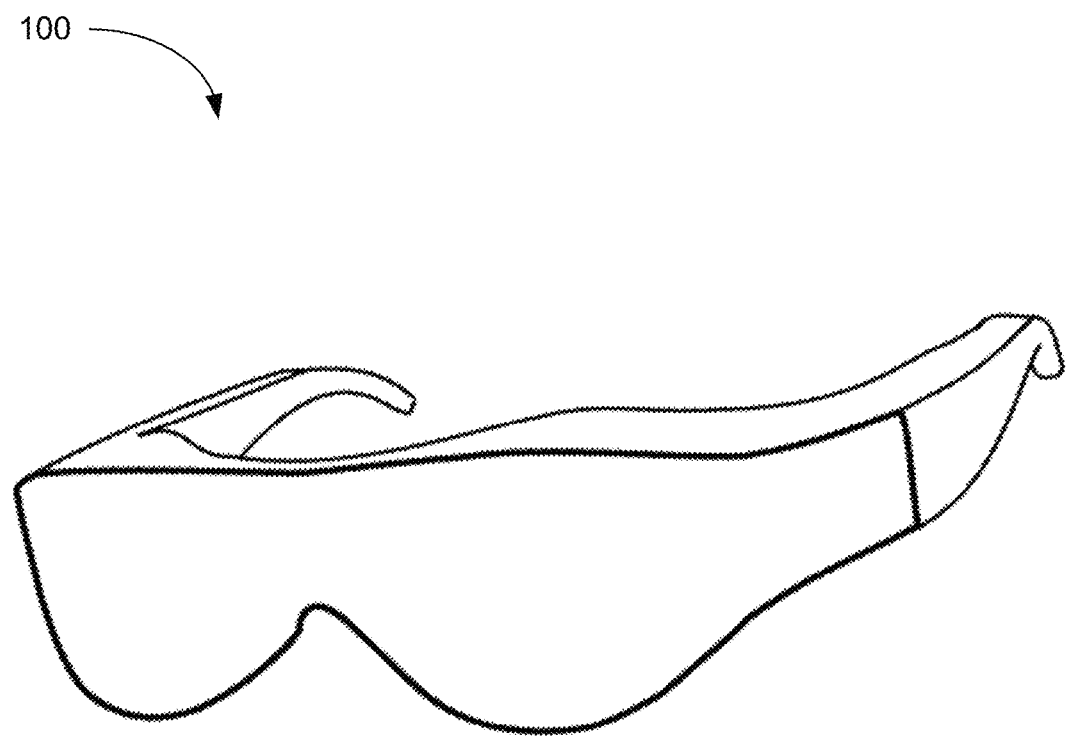
FIG. 1 is a perspective view of a display device in accordance with some embodiments.

The disclosed embodiments provide a varifocal optical assembly and a display device (e.g., a head-mounted display device) including the varifocal optical assembly. The varifocal optical assembly includes multiple adjustable stages that allow for the varifocal optical assembly to have adjustable optical power such that a perceived distance of a displayed image of an object is adjustable to match the vergence of the user's eyes. Thus, the disclosed embodiments can be used to reduce the vergence-accommodation conflict that a user may experience while using the display device, thereby increasing the user's overall comfort and enjoyment while using the display device.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
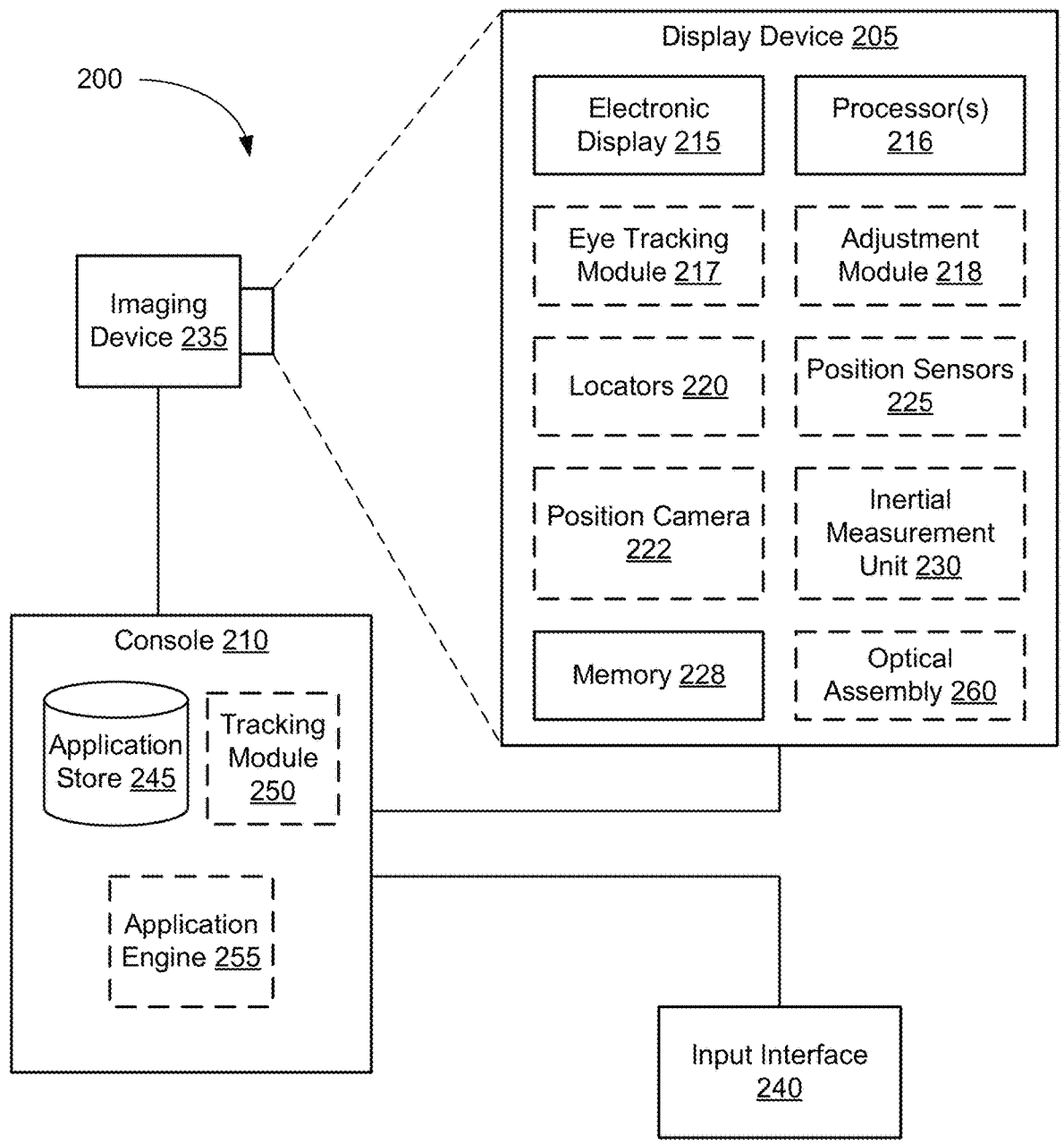
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, one or more locators 220, one or more position sensors 225, one or more position cameras 222, memory 228, controller 231, optics 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user).

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind optics 260 In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

Optics 260 direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, optics 260 include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. FIG. 3A shows some of the components of display device 205, such as electronic display 205 and optics 260. In some other embodiments, display device 300 is part of some other electronic display (e.g., a digital microscope, a head-mounted display device, etc.). In some embodiments, display device 300 includes light emission device array 310 and optical assembly 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to optical assembly 330. In some embodiments, display device 300 uses an emission intensity array to facilitate providing image light to a location of pupil 350 of eye 340 of a user, and minimize the amount of image light provided to other areas in the eyebox.

Optical assembly 330 receives the modified image light (e.g., attenuated light) from emission intensity array (or directly from emission device array 310), and direct the modified image light to a location of pupil 350.

In some embodiments, display device 300 includes one or more broadband sources (e.g., one or more white LEDs) coupled with a plurality of color filters, in addition to, or instead of, light emission device array 310.

Figure 3B:
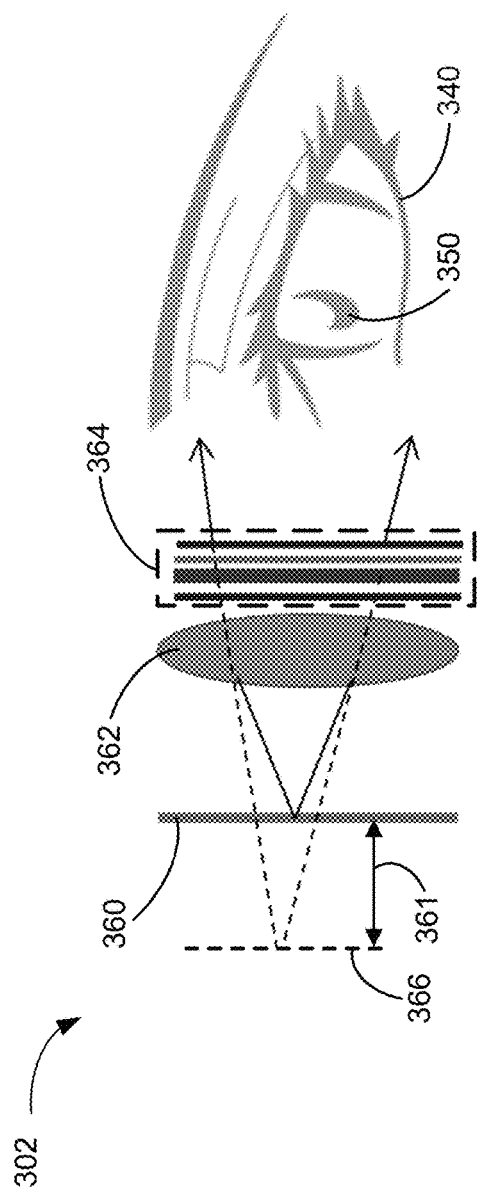
FIGS. 3B-3C illustrate a varifocal optical assembly in a display device in accordance with some embodiments.
Figure 3C:
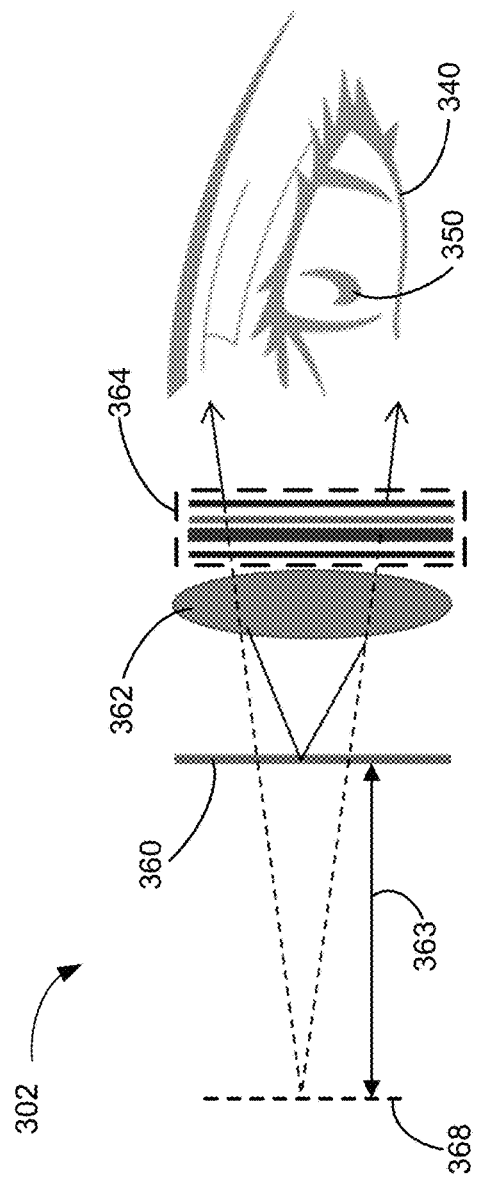

FIGS. 3B and 3C illustrate display device 302, corresponding to display device 300, in accordance with some embodiments. Display device 302 includes a display 360, a lens assembly 362, and a varifocal optical assembly 364. Referring to FIG. 3B, varifocal optical assembly 364 is configured to have a first optical power such that objects displayed by display 360 is perceived by a user's eye 340 to be at a first image plane 366, located at a first distance 361 behind display 360. In contrast, FIG. 3C shows varifocal optical assembly 364 configured to have a second optical power that is different from (in this case, greater than) the first optical power. Thus, the objects displayed by display 360 is perceived by a user's eye 340 to be at a second image plane 368, located at a second distance 363 behind display 360 that is further than first distance 361. Although FIGS. 3B and 3C show lens assembly 362 located between display 360 and varifocal optical assembly 364, varifocal optical assembly 364 may also be located between display 360 and lens assembly 362.

Figure 4A:
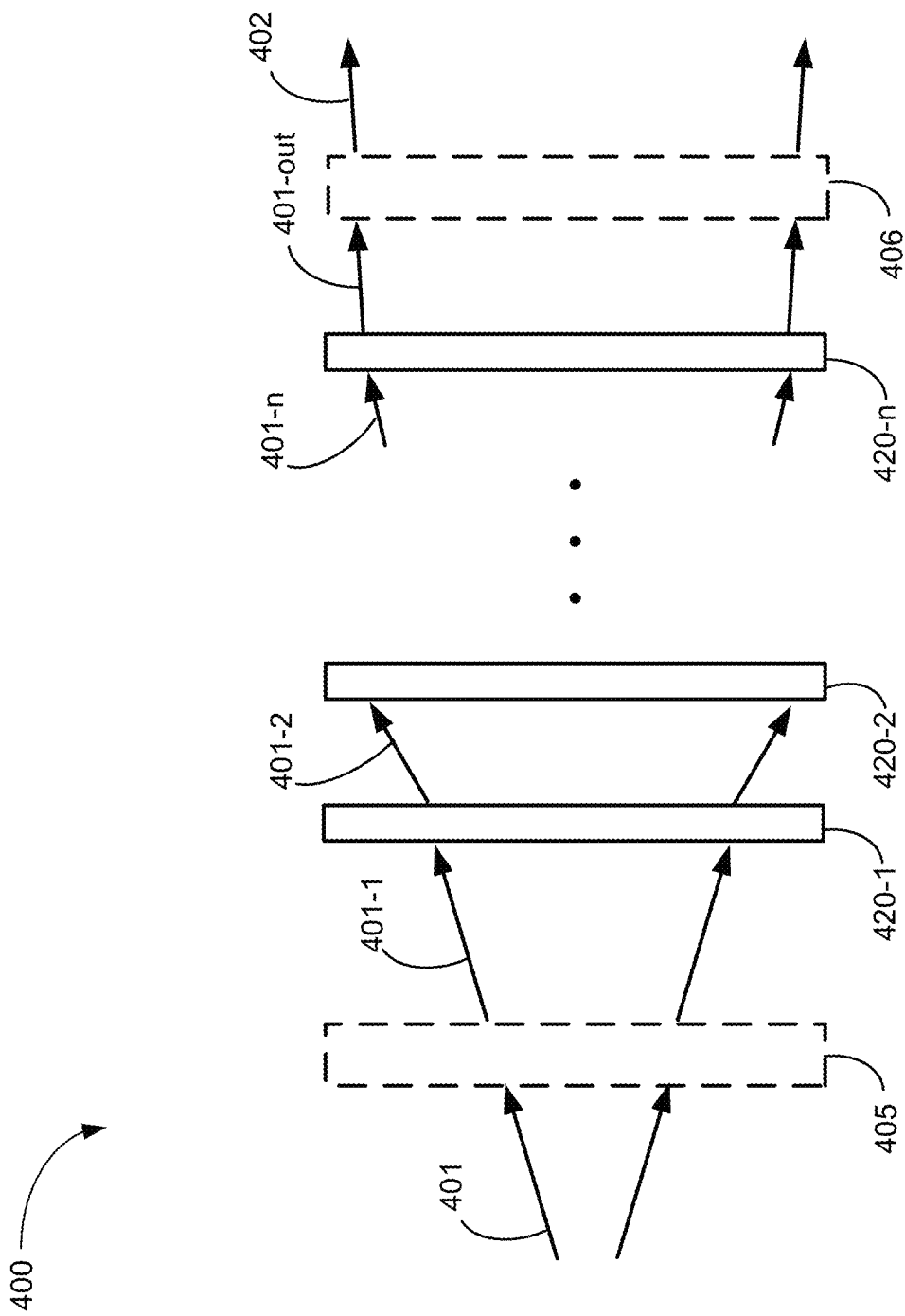
FIG. 4A illustrates a varifocal optical assembly in accordance with some embodiments.

FIG. 4A illustrates a varifocal optical assembly 400 corresponding to varifocal optical assembly 364 in accordance with some embodiments. Optical assemblies, in general, can be used to provide focusing power for a display device. The disclosed embodiments utilize varifocal optical assembly 400 to enable display devices to have adjustable optical power. In some embodiments, varifocal optical assembly 400 corresponds to optical assembly 330. In some embodiments, optics 260 includes varifocal optical assembly 400.

As shown in FIG. 4A, varifocal optical assembly 400 includes a plurality of successive optical stages 420-1, 420-2, . . . , 420-n (also referred to herein as "optical stage 420") configured to transmit light (e.g., light 401) at various optical powers. Except for a first optical stage 420-1, each respective optical stage of the successive optical stages receives incident light that is output from a prior stage. For example, as shown, second optical stage 420-2 receives light 401-2 that is output from first stage 420-1. In some embodiments, each respective stage of the successive optical stages 420 is configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization. As a result, an overall optical power of varifocal optical assembly 400 is variable by configuring one or more of the successive optical stages 420.

In some embodiments, varifocal optical assembly 400 is configured to have an overall optical power that can be at any of at least three different levels of optical power for two optical stages (e.g., n=2). For example, varifocal optical assembly 400 having two stages may have a variable overall optical power that can be any of at least three different values, such as −2 diopters, 0 diopters, and +2 diopters. In further embodiments, varifocal optical assembly 400 is configured to have an overall optical power that can be at any of at least four different levels of optical power for two or more optical stages (e.g., n>=2). For example, varifocal optical assembly 400 can have a variable overall optical power that can be any of at least four different values, such as −1.5 diopters, −0.5 diopters, +0.5 diopters, and +1.5 diopters when, for example, varifocal optical assembly 400 includes two optical stages, one optical stage with a switchable retarder and a PBP lens having 0.5 or −1.5 diopter optical power, and another optical stage with a switchable retarder and a PBP lens having 0.5 or −0.5 diopter optical power. In further embodiments, varifocal optical assembly 400 is configured to have an overall optical power that can be at any of at least four different levels of optical power for two or more optical stages (e.g., n≥2). For example, varifocal optical assembly 400 can have a variable overall optical power that can be any of at least four different values, such as −1.5 diopters, −0.5 diopters, +0.5 diopters, and +1.5 diopters, when, for example, varifocal optical assembly 400 includes at least two stages, one optical stage (e.g., an active PBP lens) having −1, 0, or 1 diopter optical power, and another optical stage (e.g., a switchable retarder and a PBP lens) having −0.5, or +0.5 diopter optical power, or when, for example, varifocal optical assembly 400 includes more than two stages, such as the examples shown in FIGS. 7B and 7C. In another example, varifocal optical assembly 400 can have a variable overall optical power that can be any of at least five different values, such as −1.5 diopters, −0.5 diopters, 0, +0.5 diopters, and +1 diopters, when, for example, varifocal optical assembly 400 includes at least two stages that each have at least one active second optical element (e.g., active PBP lens). For example, one optical stage having −1, 0, or 1 diopter optical power and another optical stage having −0.5, 0, or +0.5 diopter optical power. The overall optical power can have a larger number of different levels of optical power by adding more stages, or by including one or more stages each having an active liquid-crystal optical phase array adjustable lens with continuously tunable optical power within a certain range. In some embodiments, varifocal optical assembly 400 may further include one or more optical elements 405 before the first optical stage and/or one or more optical elements 406 after a last optical stage 420-n.

Figure 4B:
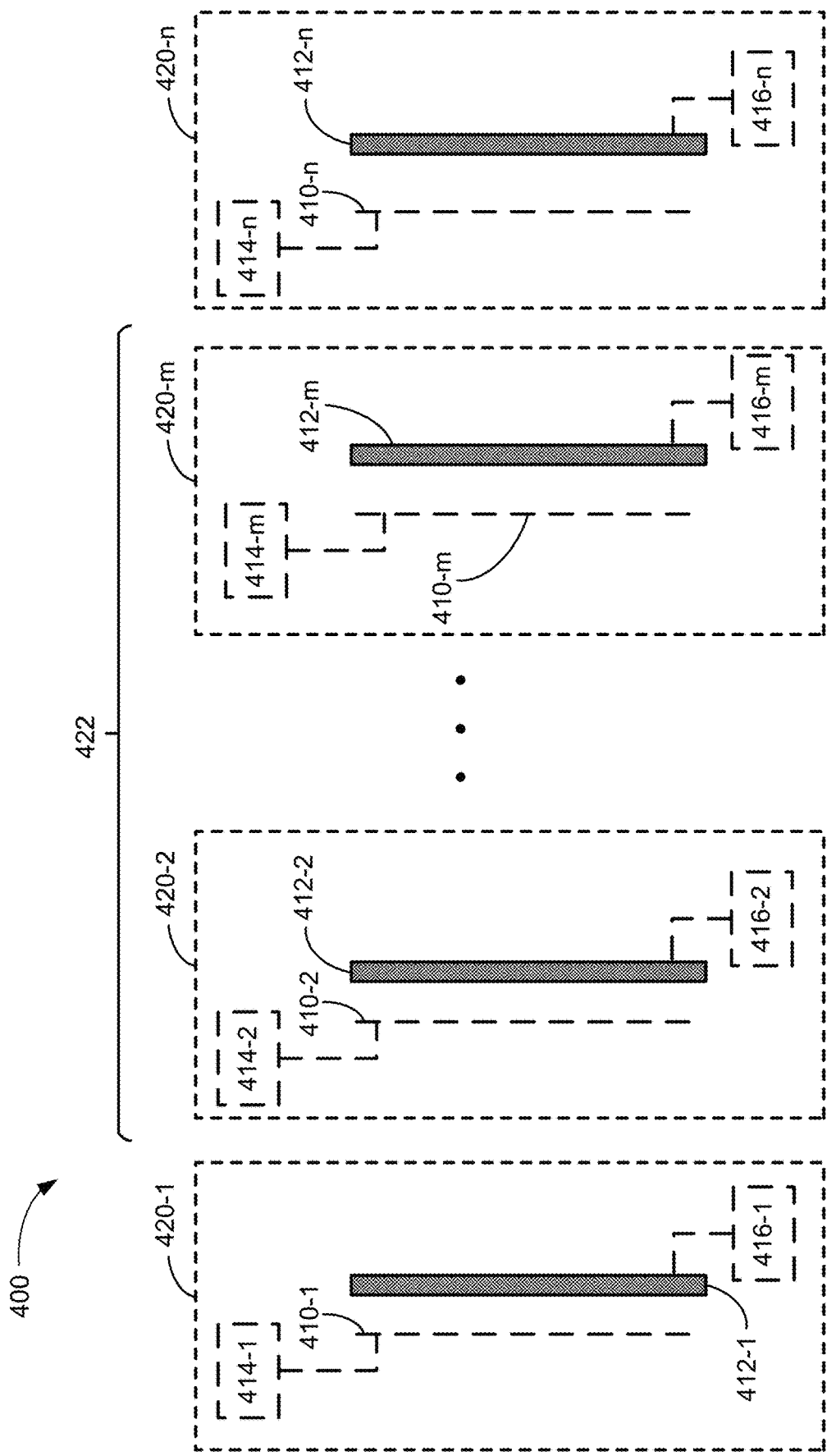
FIG. 4B illustrates a varifocal optical assembly in accordance with some embodiments.

FIG. 4B illustrates an example of varifocal optical assembly 400, in which each of the successive optical stages 420 includes a pair of optical elements, at least one of which is configurable to be in either of two different states, according to some embodiments. Thus, as shown in FIG. 4B, varifocal optical assembly 400 may include a plurality of optical elements of a first type 410-1, 410-2, . . . , 410-m, and 410-n (also referred to herein as "first optical elements 410" or "optical elements of the first type 410") and a plurality of optical elements of a second type 412-1, 412-2, . . . , 412-m, and 412-*n* (also referred to herein as "second optical elements 412" or "optical elements of the second type 412").

In some embodiments, the plurality of optical elements of the first type 410 and the plurality of optical elements of the second type 412 form a plurality of pairs of optical elements corresponding to an optical stage. In such cases, a respective pair of optical elements, corresponding to an optical stage 420, includes a respective optical element of the first type 410 and a respective optical element of the second type 412. The respective optical element of the first type 410 is configurable via a respective controller 414 to be in a first optical element state or a second optical element state. In the first optical element state, the respective optical element of the first type 410 converts light of a first or second polarization into light of a second or first polarization, respectively. The first polarization is orthogonal to the second polarization. In the second optical element state, the respective optical element of the first type 410 transmits incident light without changing its polarization. The respective optical element of the second type 412 has a first respective optical power for light of a first polarization and a second respective optical power, different from the first optical power, for light of a second polarization that is orthogonal to the first polarization. The respective optical element of the second type 412 is configured to receive light transmitted through the respective optical element of the first type 410.

The optical stages 420 are arranged successively in the optical stack such that light is transmitted through the optical stack in a plurality of successive optical stages 420. In some embodiments, the plurality of successive optical stages 420 correspond to respective ones of the plurality of optical element pairs. In some embodiments, the state of a respective optical stage 420 corresponds to the state of the optical element of the first type 410 associated with the respective optical stage. As shown, the optical stack has an input side and an output side. A first optical stage 420-1, corresponding to a first optical element pair, is located at the input side of the optical stack and a last optical stage 420-*n*, corresponding to a last optical element pair, is located at the output side of the optical stack. Additionally, in some embodiments, the optical stack also includes one or more additional stages (e.g., additional optical stages 420-2, . . . , 420-*m*), referred to hereafter collectively or individually as additional optical stages 422, between the first stage and the last stage.

In some embodiments, as shown in FIG. 4B, each optical element pair includes a first optical element 410 and a second optical element 412 that is configured to receive light transmitted through the first optical element 410. The first optical element 410 is electrically connected to controller 414 (e.g., controller 414-1, 414-2, 414-*m*, or 414-*n*), referred to hereafter individually and collectively as 414, which is configured to control (e.g., adjust) the state of first optical element 410.

The first optical element 410 is configurable to be in a first optical element state (e.g., an "off" state) or a second optical element state (e.g., an "on" state). In the first optical element state, first optical element 410 is configured to convert incident light to transmitted light having different polarization from that of the incident light. In the second optical element state, first optical element 410 is configured to transmit incident light without changing its polarization. For example, when first optical element 410 is set to the first state, left circularly polarized (LCP) light incident upon first optical element 410 will be transmitted as right circularly polarized (RCP) light, and vice versa. In contrast, when first optical element 410 is set to the second state, incident upon first optical element 410 will be transmitted without a change in its polarization (e.g., LCP light remains LCP and RCP light remains RCP). In some embodiments, the first optical element 410 is a switchable retarder or switchable wave plate, such as a switchable half-wave plate.

The second optical element 412 has a first respective optical power for light of a first polarization and a second respective optical power, different from the first optical power, for light of a second polarization that is orthogonal to the first polarization.

In some embodiments, the second respective optical power is less than the first respective optical power. In some embodiments, the second respective optical power is zero. For example, second optical element 412 may have a first optical power that is non-zero for RCP light and is configured convert the RCP light to LCP light while converging or diverging (depending on the first optical power) the RCP light. The second optical element is also configured to transmit LCP light without changing the direction or polarization of the LCP light.

In some embodiments, the second respective optical power is about equal in magnitude to the first respective optical power but is opposite in effect from the first respective optical power. For example, second optical element 412 may act as a positive lens that has an optical power of +0.5 diopters for RCP light and may act as a negative lens that has an optical power of −0.5 diopters for LCP light. Thus, the optical power of the second optical element 412, and therefore the optical power of the corresponding optical stage, is based on the state of the corresponding first optical element 410 and the polarization of light incident on the respective optical stage.

In some embodiments, the second optical element 412 is a polarization sensitive optical element. In some embodiments, the second optical element 412 includes one or more of a Pancharatnam-Berry phase (PBP) lens (also called a geometric phase lens), a PBP grating (also called a geometric phase grating), a polarization sensitive hologram (PSH) lens, a PSH grating, and a liquid crystal optical phase array. Details regarding PBP lens and PSH lens are provided below with respect to FIGS. 6A-6D and FIGS. 6E-6H, respectively.

In some embodiments, the second optical element 412 includes a thin film formed on a surface of the corresponding first optical element. For example, the second optical element 412 may be a coating or a thin film that is located/deposited on a surface of the corresponding first optical element 410.

In some embodiments, a respective second optical element 412 has a respective optical power. In some embodiments, a magnitude of the optical power of any second optical element 412 is no greater than 2.0 diopters (e.g., the optical power is no stronger than −2 diopters or +2 diopters). In some embodiments, a second optical element 412 of an optical stage has an optical power that is different from another second optical element 412 of another optical stage. In some embodiments, the second optical element 412-1 of the first optical stage 420-1 has a first optical power and the last optical element 412-*n* of the last optical stage 420-*n* has a second optical power that is different from the first optical power. In some embodiments, the second optical power is larger in magnitude than the first optical power.

In some embodiments, as shown in FIG. 4B, one or more of the successive optical stages 420-1, 420-2, . . . , 420-*n* each includes an active second optical element 412 that is configurable via a respective controller 416 (e.g., controllers 416-1, 416-2, 416-*m*, 416-*n*) to be in any of a third optical element state (e.g., an "off" state) and a fourth optical element state (e.g., an "on" state). In the third optical element state, the active second optical element 412 is configured to have the first respective optical power for incident light having the first polarization and the second respective optical power for incident light having the second polarization. In the fourth optical element state, the active second optical element 412 is configured to have zero optical power and is configured to transmit the incident light without exerting optical power regardless of polarization of the incident light. In some embodiments, such as when the second optical element 412 is an active PSH optical element, the second respective optical power is zero. In some embodiments, such as when the second optical element is an active PBP optical element, the second respective optical power is equal in magnitude and opposite in effect to the first respective optical power. As a result, a particular optical stage (e.g. stage 420-2) including a first optical element (e.g., optical element 410-2) and an active second optical element (e.g., optical element 412-2) can have more than two different states depending on the states of the first optical element and the active second optical element in the particular stage.

In some embodiments, one or more optical stages of the successive optical stages 420 includes only one of a first optical element 410 and an active second optical element 412. For example, an optical stage of the successive optical stages 420 may include active second optical element without including first optical element 410.

In general, the optical stack is configured to receive light at the input end, transmit the light through the optical stack (e.g., through the first optical stage 420-1, the one or more additional stages 422, and the last optical stage 420-n), and output the light at the output end of the optical stack such that the divergence of the light is changed.

Thus, the overall optical power of varifocal optical assembly 400 is adjustable by adjusting or changing the respective states of the optical stages 420.

In some embodiments, when an optical stage 420 includes an optical element pair, the overall optical power of varifocal optical assembly 400 can be adjusted by adjusting or changing the respective states of the first optical elements 410 in the plurality of optical stages 420. The optical power of the optical stack can be changed by switching the state of the first optical elements 410 in any optical stage, thereby changing the optical power of the optical stage. The optical powers of the successive optical stages 420 in combination determine the resultant total optical power of the optical stack.

FIGS. 5A-5D illustrate optical properties of an optical stage (e.g., optical stage 420) corresponding to an optical element pair 500 of a varifocal optical assembly (e.g., varifocal optical assembly 400) in accordance with some embodiments. Optical element pair 500 includes a switchable optical element 510, corresponding to first optical element 410, that is electrically coupled to controller 514, corresponding to controller 414. In some embodiments, switchable optical element 510 is a switchable half-wave plate.

Optical element pair 500 also includes optical element 512, corresponding to second optical element 412 in accordance with some embodiments. Optical element 512 has a positive optical power for LCP light and a negative optical power for RCP light. In other words, optical element 512 is configured to act as a positive lens (e.g., converging lens) when LCP light is incident on optical element 512. When RCP light is incident on optical element 512, optical element 512 is configured to act as a negative lens (e.g., diverging lens). In some embodiments, optical element 512 is a PBP lens, described below with respect to FIGS. 6A-6D.

FIGS. 5A-5D illustrate optical properties of an optical stage that includes an optical element pair 500.

Figure 5A:
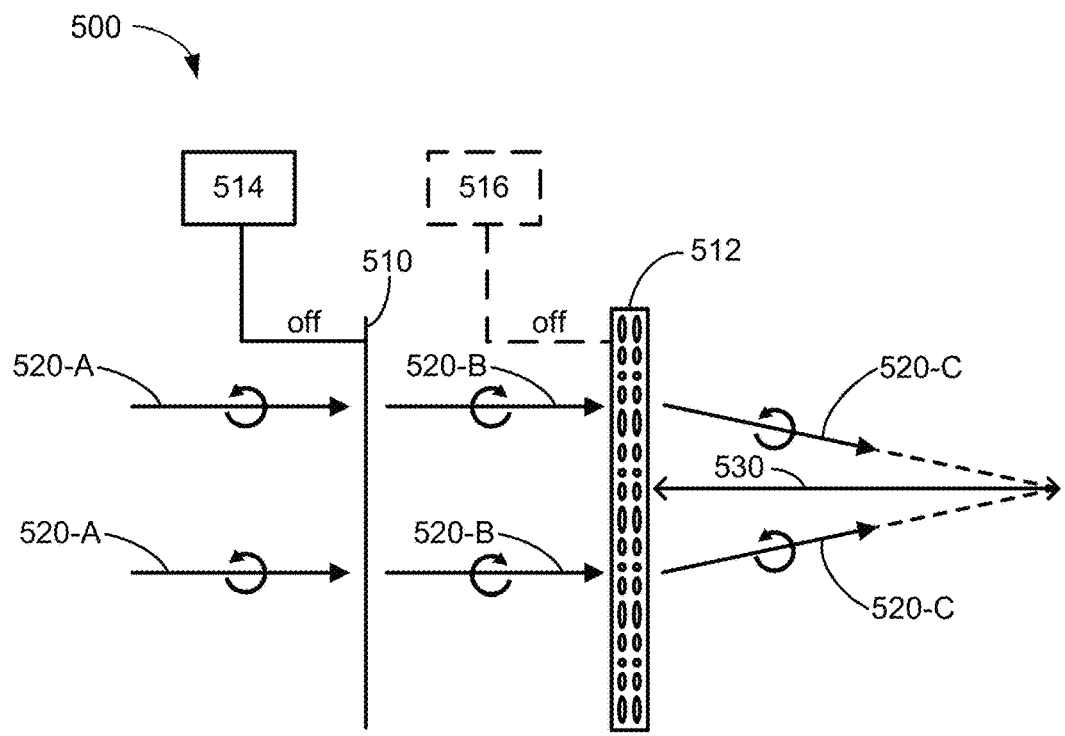
FIGS. 5A-5N illustrate optical properties of optical elements in a varifocal optical assembly in accordance with some embodiments.

Referring to FIG. 5A, switchable optical element 510, in the first optical element state (corresponding to a first state of the optical stage), receives incident RCP light 520-A and converts RCP light 520-A into LCP light 520-B. Optical element 512 receives LCP light 520-B output from switchable optical element 510, and converts LCP light 520-B into RCP light 520-C while converging it. In some embodiments, when LCP light 520-B is substantially collimated, RCP light 520-C is focused by optical element 512 to a focal point located a distance 530 away from optical element 512.

Figure 5B:
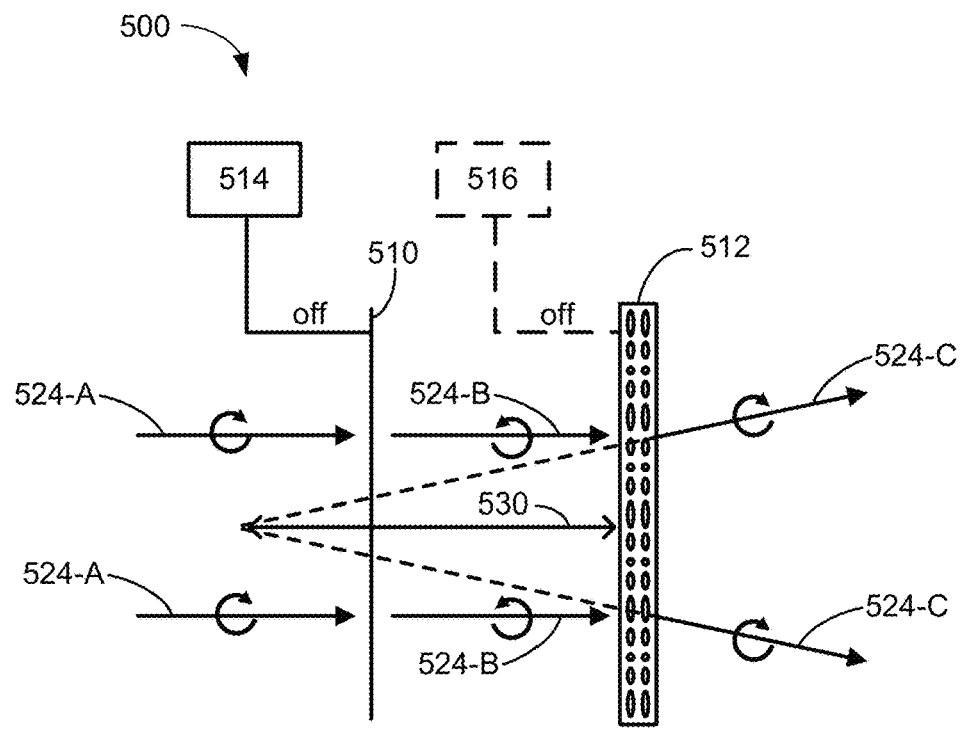

Referring to FIG. 5B, switchable optical element 510, in the first optical element state, receives incident LCP light 524-A converts LCP light 524-A into RCP light 524-B. Optical element 512 receives RCP light 524-B output from switchable optical element 510 and converts RCP light 524-B as LCP light 524-C while diverging it. In some embodiments, when RCP light 524-B is substantially collimated, LCP light 524-C is diverged by optical element 512 such that a virtual focal point of the diverging light would be located at distance 530 away from optical element 512.

Figure 5C:
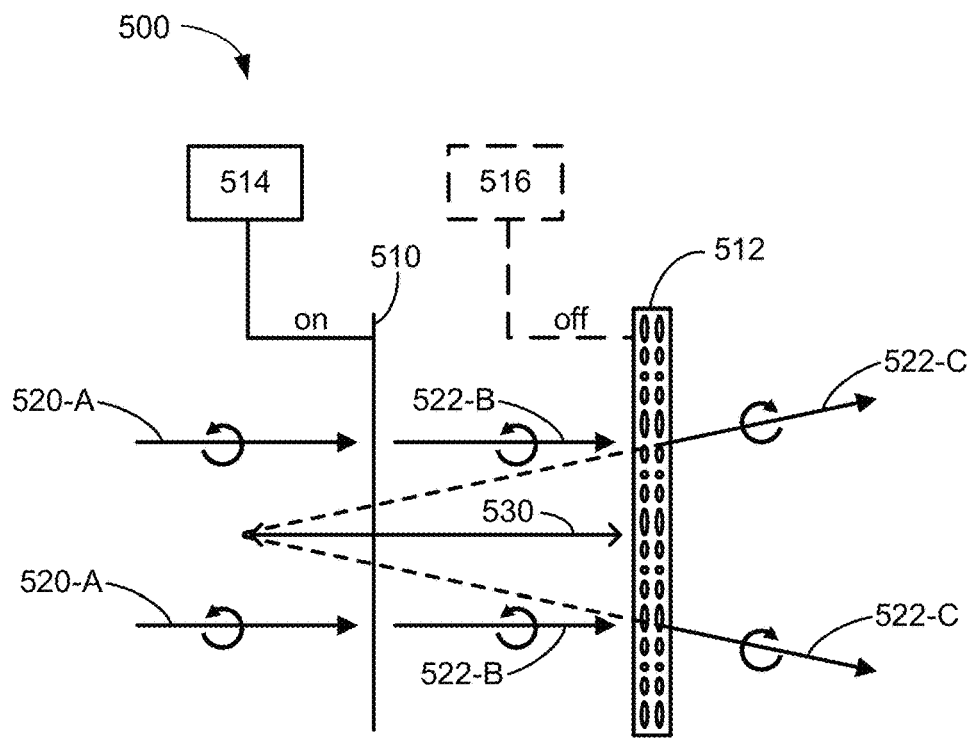

Referring to FIG. 5C switchable optical element 510, in the second optical element state (corresponding to a second state of the optical stage), receives incident RCP light 520-A and transmits RCP light 520-A as RCP light 522-B. Optical element 512 receives RCP light 522-B output from switchable optical element 510 and converts RCP light 522-B into LCP light 522-C while diverging it. In some embodiments, when RCP light 522-B is substantially collimated, LCP light 522-C is diverged by optical element 512 such that a virtual focal point of the diverging light would be located at distance 530 away from optical element 512.

Figure 5D:
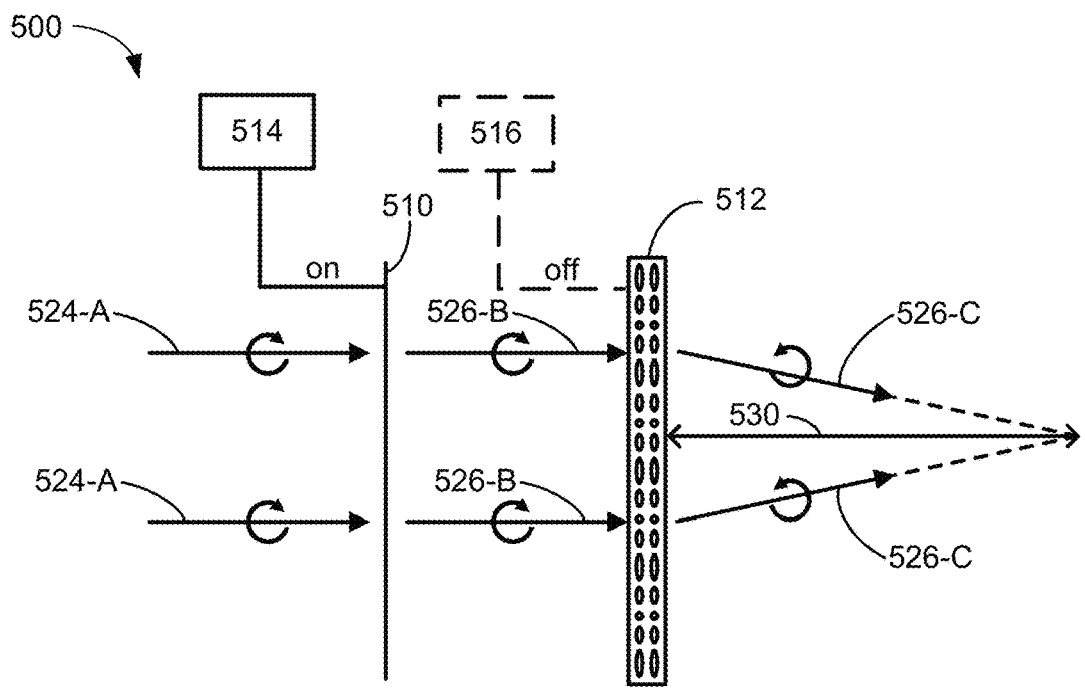

Referring to FIG. 5D, switchable optical element 510, in the second state, receives incident LCP light 524-A and transmits LCP light 524-A as LCP light 526-B. Optical element 512 receives LCP light 526-B output from switchable optical element 510 and converts LCP light 526-B as RCP light 526-C while converging it. In some embodiments, when LCP light 526-B is substantially collimated, RCP light 526-C is focused by optical element 512 to a focal point located a distance 530 away from optical element 512.

FIGS. 5E-5H illustrate optical properties of an optical stage including an optical element pair 502 (e.g., optical element pair 420) of a varifocal optical assembly (e.g., varifocal optical assembly 400) in accordance with some embodiments. Optical element pair 502 is similar to optical element pair 500 except that optical element pair 502 includes optical element 513 instead of optical element 512. Optical element 513 is configured to have a positive optical power for RCP light and a negative optical power for LCP light. In other words, optical element 513 is configured to act as a positive lens (e.g., converging lens) when RCP light is incident on optical element 513 and to act as a negative lens (e.g., diverging lens) when LCP light is incident on optical element 513.

Figure 5E:
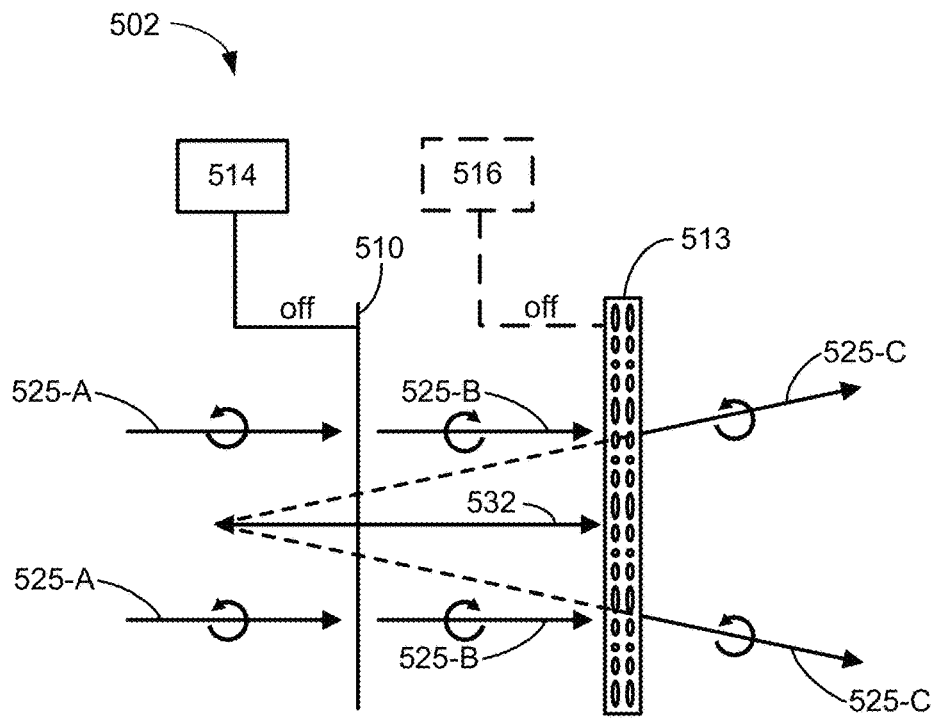

Referring to FIG. 5E, switchable optical element 510, in the first state, receives incident RCP light 525-A and converts RCP light 525-A into LCP light 525-B. Optical element 513 receives LCP light 525-B output from switchable optical element 510 and converts LCP light 525-B into RCP light 525-C while diverging it. In some embodiments, when LCP light 525-B is substantially collimated, RCP light 525-C is diverged by optical element 513 such that a virtual focal point of the diverging light would be located at distance 532 away from optical element 513.

Figure 5F:
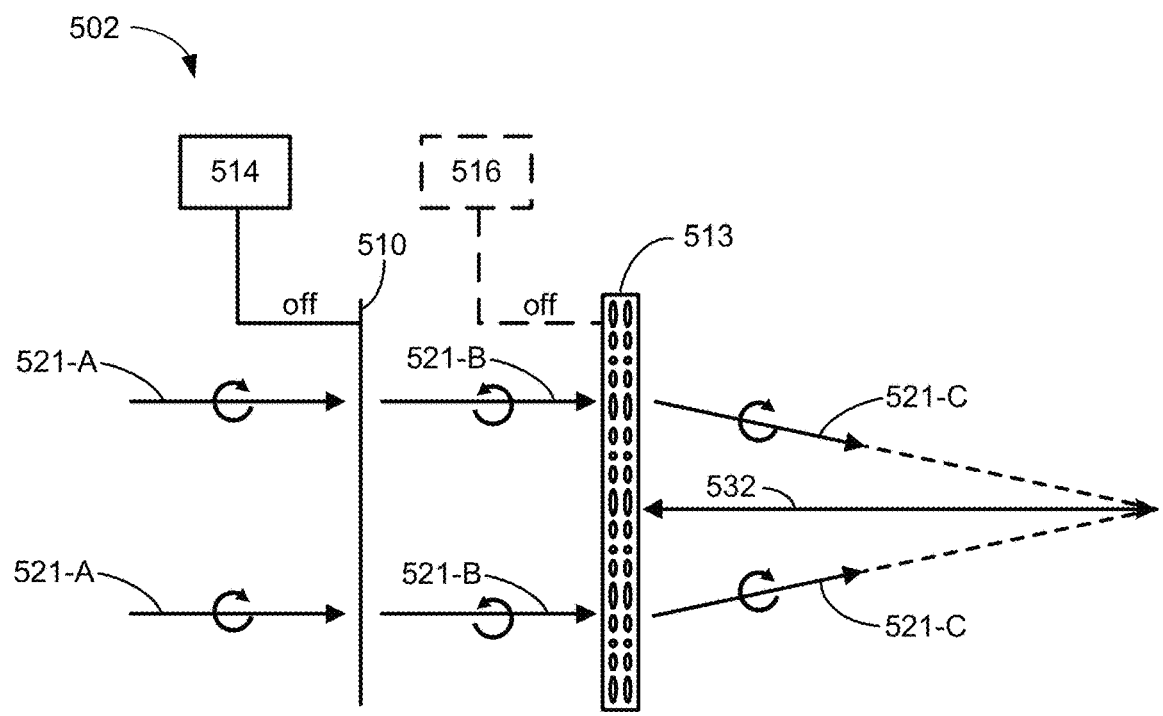

Referring to FIG. 5F, switchable optical element 510, in the first optical element state, receives incident LCP light 521-A and converts LCP light 521-A into RCP light 521-B. Optical element 513 receives RCP light 521-B output from switchable optical element 510 and converts RCP light 521-B as LCP light 521-C while converging it. In some embodiments, when RCP light 521-B is substantially collimated, LCP light 521-C is focused by optical element 513 to a focal point located a distance 532 away from optical element 513.

Figure 5G:
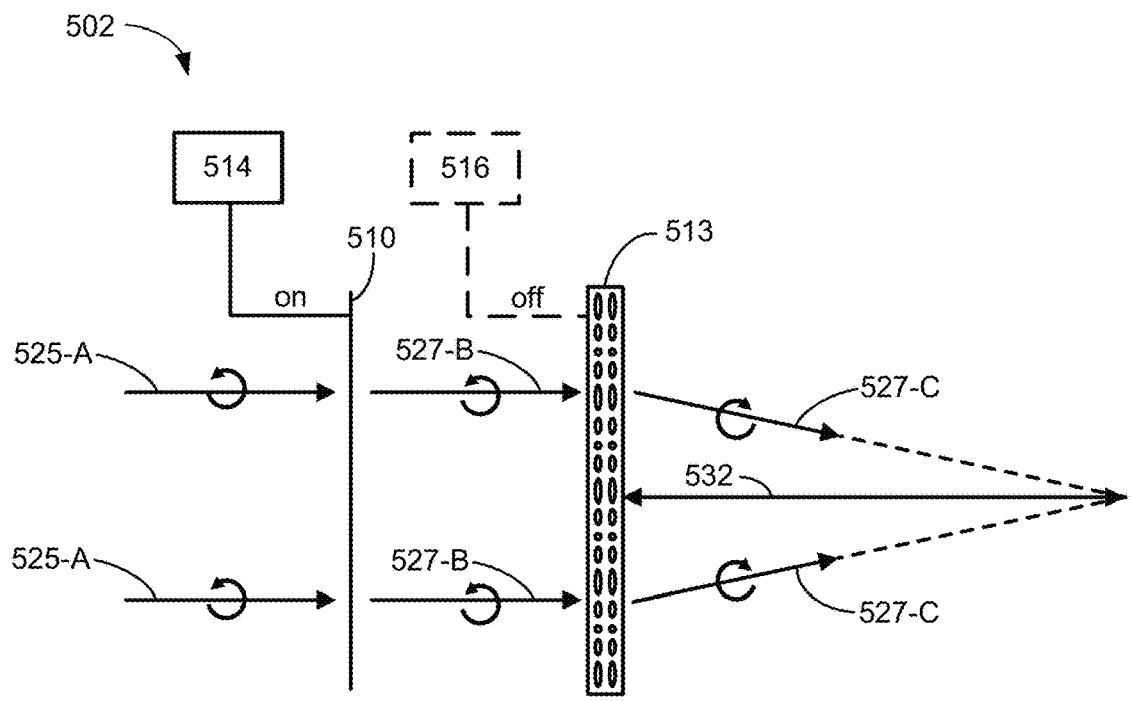

Referring to FIG. 5G, switchable optical element 510, in the second state, receives incident RCP light 525-A and transmits light 525-A as RCP light 527-B. Optical element 513 receives RCP light 527-B output from switchable optical element 510 and converts RCP light 527-B into LCP light 527-C while converging it. In some embodiments, when light RCP light 527-B is substantially collimated, LCP light 527-C is focused by optical element 513 to a focal point located a distance 532 away from optical element 513.

Figure 5H:
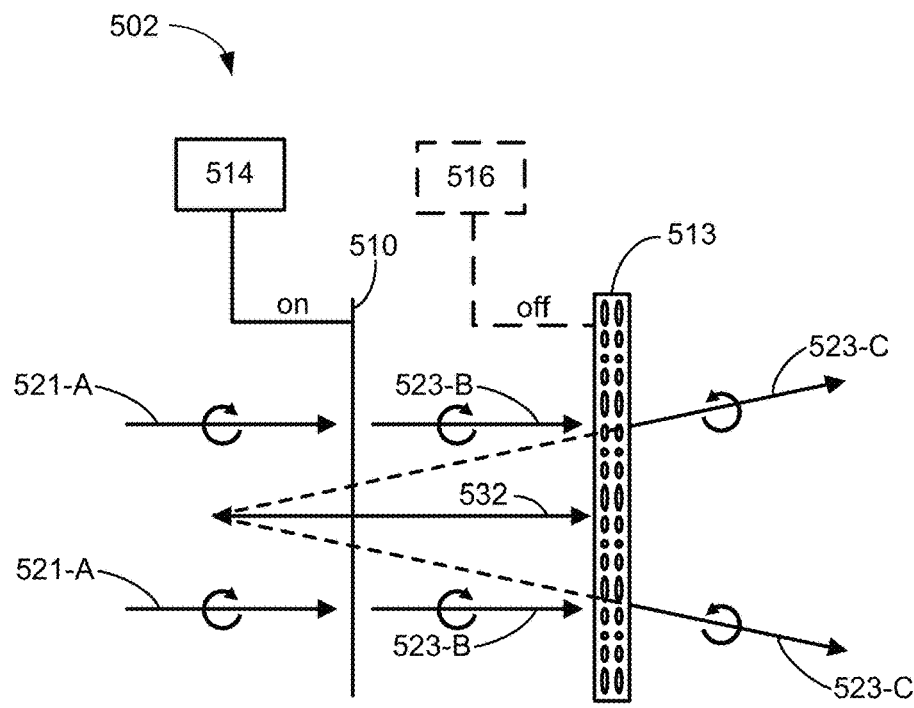

Referring to FIG. 5H, switchable optical element 510, in the second state, receives incident LCP light 521-A and transmits LCP light 521-A as LCP light 523-B. Optical element 513 receives LCP light 523-B output from switchable optical element 510 and converts LCP light 523-B as RCP light 523-C while diverging it. In some embodiments, when LCP light 523-B is substantially collimated, RCP light 523-C is diverged by optical element 513 such that a virtual focal point of the diverging light would be located at distance 532 away from optical element 513.

Figure 5I:
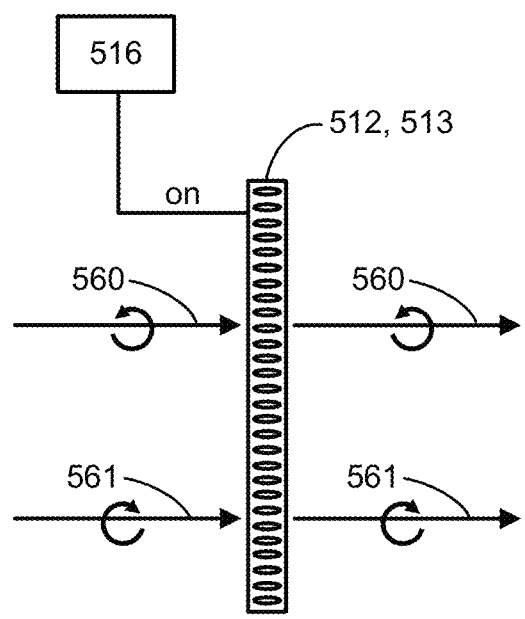

In some embodiments, second optical elements 512 and/or 513 can be active optical elements configurable via controller 516 to be in a third optical element state (e.g., "off" state), as shown in FIGS. 5A-5H, or a fourth optical element state (e.g., "on" state), as shown in FIG. 5I.

In some embodiments, optical element 512, 513 is a PBP lens or an active PBP lens. In some embodiments, a polarization sensitive hologram optical element (e.g., PSH lens or active PSH lens) may be included in an optical stage (e.g., optical element pair 500 or 502) in place of optical element 512 or optical element 513.

Figure 5J:
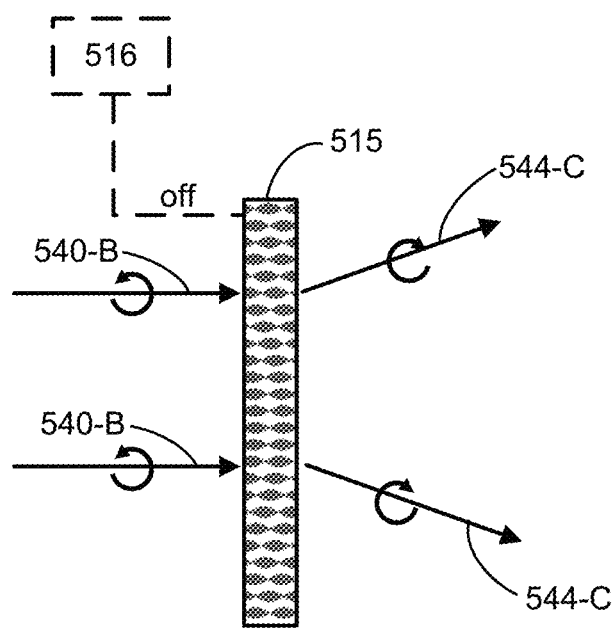
Figure 5K:
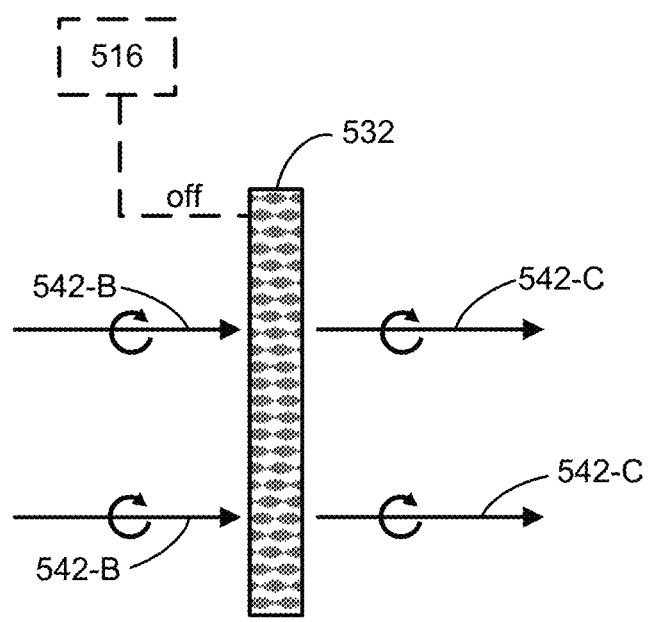

FIGS. 5J-5K illustrate optical properties of polarization sensitive hologram optical elements 515, which can be used in place of optical element 512 or optical element 513 in optical element pair 500 or 502, respectively, in accordance with some embodiments.

As shown in FIGS. 5J and 5K, optical element 515 has a non-zero optical power for RCP light and zero optical power for LCP light. In other words, optical element 515 is configured to act as a lens when RCP light is incident on optical element 515 and convert the RCP light into LCP light while converging/diverging it (depending on the non-zero optical power). When LCP light is incident on optical element 515, optical element 515 is configured to transmit the LCP light without change in polarization or direction. In this example, optical element 515 has a negative optical power for RCP light and is configured to convert RCP light into LCP light while diverging it. In some embodiments, optical element 515 is a PSH lens, described below with respect to FIGS. 6E-6H.

Referring to FIG. 5J, optical element 515 receives RCP light 540-B and converts RCP light 540-B into LCP light 544-C while diverging it. Referring to FIG. 5K, optical element 515 receives LCP light 542-B and transmits LCP light 542-B as LCP light 542-C without changing its direction or polarization.

Figure 5L:
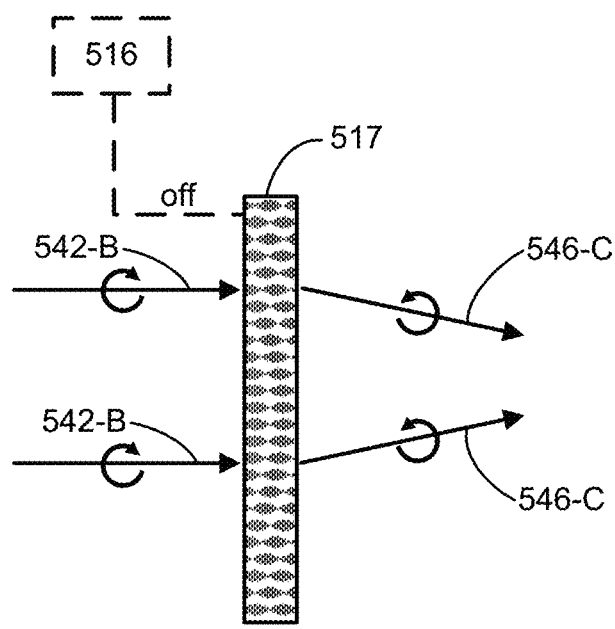
Figure 5M:
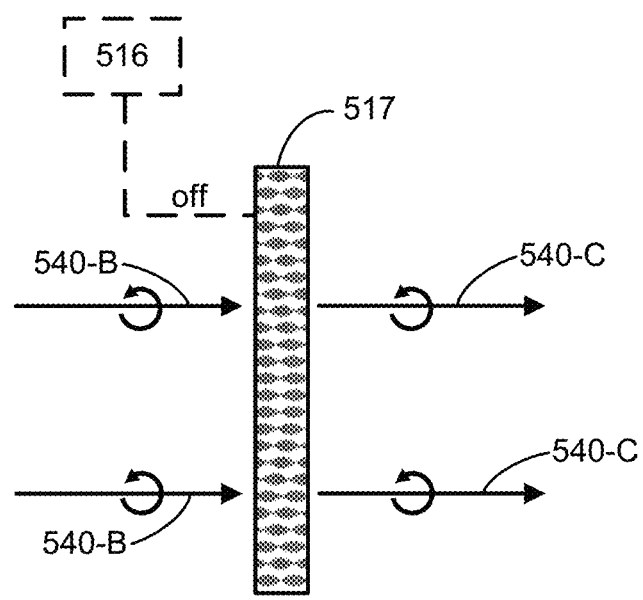

FIGS. 5L and 5M illustrate optical element 517 that has a non-zero optical power for LCP light and zero optical power for RCP light, which can be used in place of optical element 512 or optical element 513 in optical element pair 500 or 502, respectively. In some embodiments, optical element 517 is configured to act as a lens when LCP light is incident on optical element 517 by converting the LCP light into RCP light while converging/diverging it (depending on the non-zero optical power). When RCP light is incident on optical element 517, optical element 517 is configured to transmit the RCP light without change in polarization or direction. In this example, optical element 517 has a positive optical power for LCP light and is configured to convert LCP light into RCP light while converging it. In some embodiments, optical element 517 is a PSH lens, described below with respect to FIGS. 6E-6H.

Referring to FIG. 5L, optical element 517 receives LCP light 542-B and converts LCP light 542-B into RCP light 546-C while converging it.

Referring to FIG. 5M, optical element 517 receives RCP light 540-B and transmits RCP light 540-B as RCP light 540-C without changing its direction or polarization.

Figure 5N:
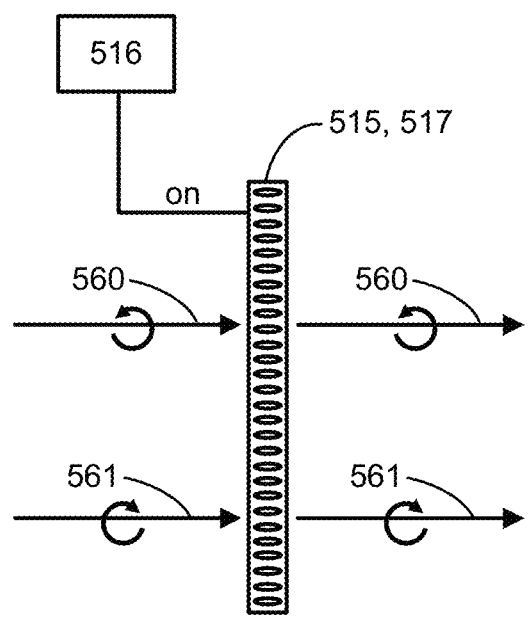

In some embodiments, second optical elements 515 and/or 517 can be active optical elements configurable via controller 516 to be in a third optical element state (e.g., "Off" state), as shown in FIGS. 5J-5M, or a fourth optical element state (e.g., "On" state), as shown in FIG. 5N.

FIGS. 6A-6D are schematic diagrams illustrating Pancharatnam-berry phase (PBP) lens 600 in accordance with some embodiments. In some embodiments, the second optical element 412 of an optical stage 420 in varifocal optical assembly 400, described above with respect to FIGS. 4 and 5A-5H, includes PBP lens 600. In some embodiments, PBP lens 600 is a liquid crystal optical element that includes a layer of liquid crystals. In some embodiments, PBP lens 600 includes a layer of other type of substructures, e.g., nanopillars composed of high refraction index materials. PBP lens 600 adds or removes optical power based in part on polarization of incident light. For example, if RCP light is incident on PBP lens 600, PBP lens 600 acts as a positive lens (i.e., it causes light to converge). And, if LCP light is incident on the PBP lens, the PBP lens acts as a negative lens (i.e., it causes light to diverge). In some embodiments, PBP lenses also change the handedness of light to the orthogonal handedness (e.g., changing LCP to RCP or vice versa). PBP lenses are also wavelength selective. If the incident light is at the designed wavelength, LCP light is converted to RCP light, and vice versa. In contrast, if incident light has a wavelength that is outside the designed wavelength range, at least a portion of the light is transmitted without change in its polarization and without focusing or converging. PBP lenses may have a large aperture size and can be made with a very thin liquid crystal layer. Optical properties of the PBP lens (e.g., focusing power or diffracting power) are based on variation of azimuthal angles (θ) of liquid crystal molecules. For example, for a PBP lens, azimuthal angle θ of a liquid crystal molecule is determined based on Equation (1):

$$\theta = \left(\frac{r^2}{f} * \frac{\pi}{\lambda}\right) / 2 \qquad (1)$$

where r denotes a radial distance between the liquid crystal molecule and an optical center of the PBP lens, f denotes a focal distance, and λ denotes a wavelength of light that the PBP lens is designed for. In some embodiments, the azimuthal angles of the liquid crystal molecules in the x-y plane increase from the optical center to an edge of the PBP lens.

In some embodiments, as expressed by Equation (1), a rate of increase in azimuthal angles between neighboring liquid crystal molecules also increases with the distance from the optical center of the PBP lens. The PBP lens creates a respective lens profile based on the orientations (i.e., azimuthal angle θ) of a liquid crystal molecule in the x-y plane. In contrast, a (non-PBP) liquid crystal lens creates a lens profile via a birefringence property (with liquid crystal molecules oriented out of x-y plane, e.g., a non-zero tilt angle from the x-y plane) and a thickness of a liquid crystal layer.

Figure 6C:
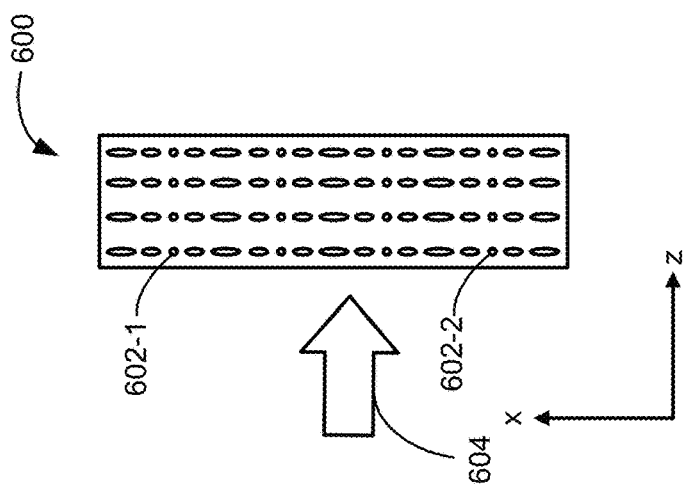
FIGS. 6A-6D are schematic diagrams illustrating a Pancharatnam-Berry phase lens in accordance with some embodiments.
Figure 6B:
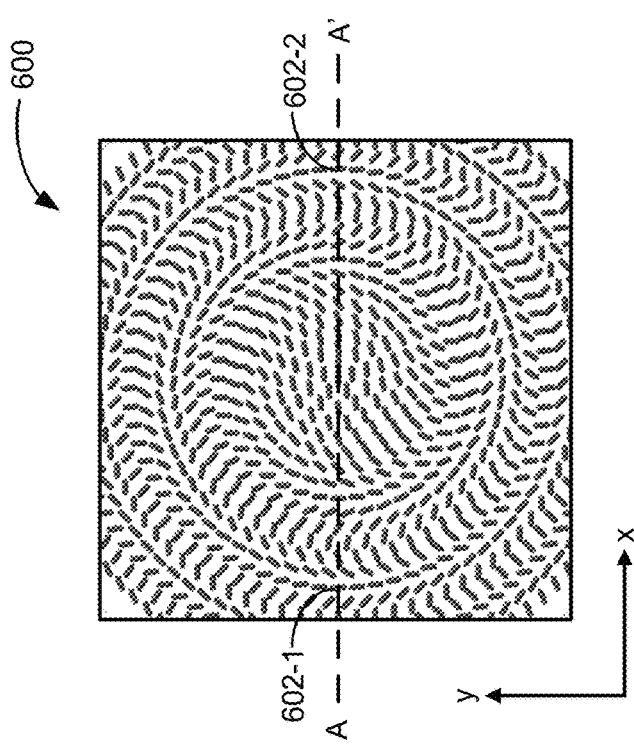
Figure 6A:
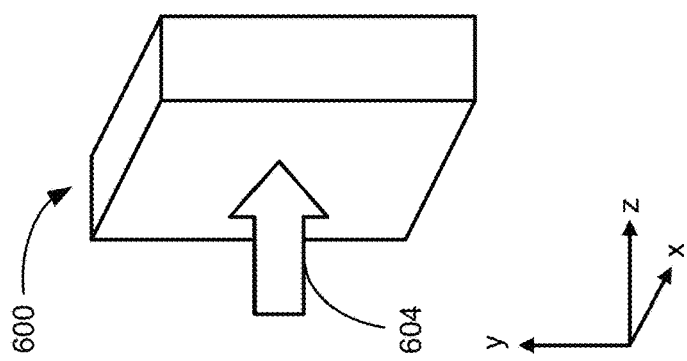

FIG. 6A illustrates a three-dimensional view of PBP lens 600 with incoming light 604 entering the lens along the z-axis.

FIG. 6B illustrates an x-y-plane view of PBP lens 600 with a plurality of liquid crystals (e.g., liquid crystals 602-1 and 602-2) with various orientations. The orientations (i.e., azimuthal angles θ) of the liquid crystals vary along reference line between A and A' from the center of PBP lens 600 toward the periphery of PBP lens 600.

Figure 6D:
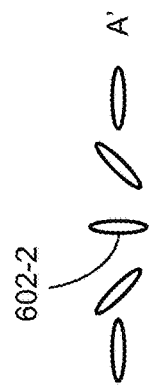
Figure 6D:
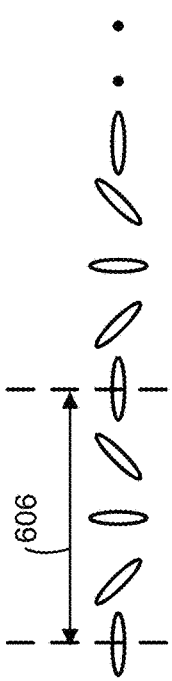

FIG. 6C illustrates an x-z-cross-sectional view of PBP lens 600. As shown in FIG. 6C, the orientations of the liquid crystal (e.g., liquid crystals 602-1 and 602-2) remain constant along z-direction. FIG. 6C illustrates an example of a PBP structure that has constant variation along z and birefringent thickness (Δn×t) that is ideally half of the designed wavelength, where Δn is the birefringence of the liquid crystal material and t is the physical thickness of the plate. A PBP optical element (e.g., lens, grating) may have a liquid crystal structure that is different from the one shown in FIG. 6C. For example, a PBP optical element may include a double twist liquid crystal structure along the z-direction. In another example, a PBP optical element may include a three-layer alternate structure along the z-direction in order to provide achromatic response across a wide spectral range. FIG. 6D illustrates a detailed plane view of the liquid crystals along the reference line between A and A' shown in FIG. 6B. Pitch 606 is defined as a distance along the x-axis at which the azimuthal angle θ of a liquid crystal has rotated 180 degrees. In some embodiments, pitch 606 varies as a function of distance from the center of PBP lens 600. In a case of a lens, the azimuthal angle θ of liquid crystals varies in accordance with Equation (1) shown above. In such cases, the pitch at the center of the lens is longest and the pitch at the edge of the lens is shortest.

FIGS. 6E-6H are schematic diagrams illustrating a polarization sensitive hologram (PSH) lens in accordance with some embodiments. In some embodiments, the second optical element 412 of an optical element pair in varifocal optical assembly 400, described above with respect to FIGS. 4 and 5A-5H, includes (PSH) lens 610. PSH lens 610 is a liquid crystal PSH lens including a layer of liquid crystals arranged in helical structures (e.g., a liquid crystal formed of a cholesteric liquid crystal). Similar to a PBP lens (described above with respect to FIGS. 6A-6D), a PSH lens adds or removes optical power based in part on polarization of an incident light. However, PSH lens is selective with respect to circular polarization of light. When state (handedness) of the circularly polarized light is along a helical axis of a liquid crystal, the PSH lens interacts with the circularly polarized light and thereby changes the direction of the light (e.g., refracts or diffracts the light). Concurrently, while transmitting the light, the PSH lens also changes the polarization of the light. In contrast, the PSH lens transmits light with opposite circular polarization without changing its direction or polarization. For example, a PSH lens changes polarization of RCP light to LCP light and simultaneously focuses or defocuses the light while transmitting LCP light without changing its polarization or direction. Optical properties of the PSH lens (e.g., focusing power of diffracting power) are based on variation of azimuthal angles of liquid crystal molecules. In addition, the optical properties of the PSH are based on a helical axis and/or a helical pitch of a liquid crystal.

Figure 6G:
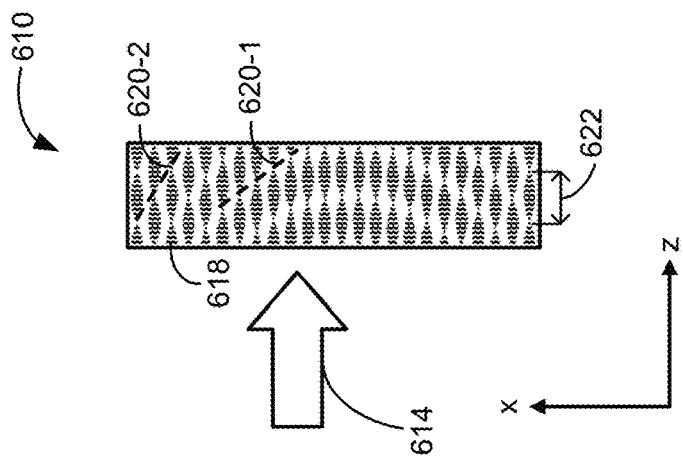
FIGS. 6E-6H are schematic diagrams illustrating a polarization sensitive hologram lens in accordance with some embodiments.
Figure 6F:
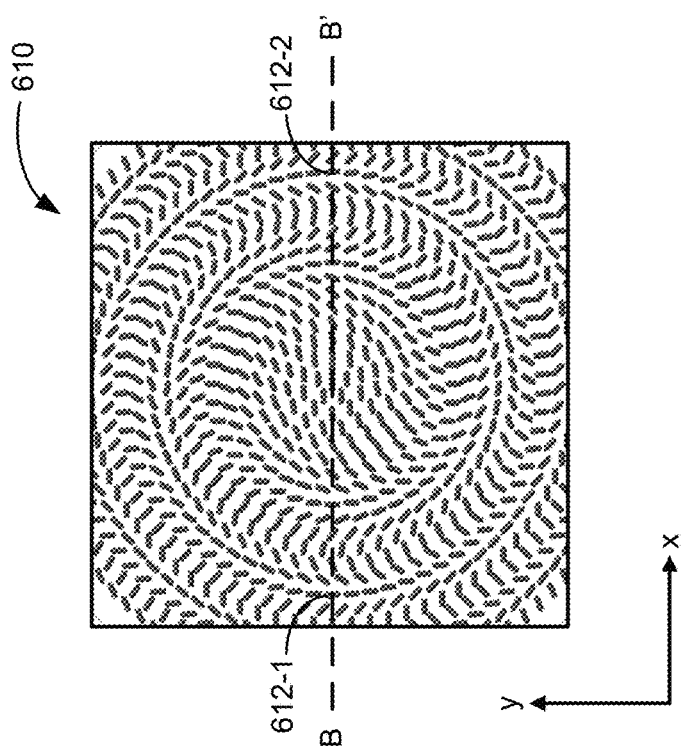
Figure 6E:
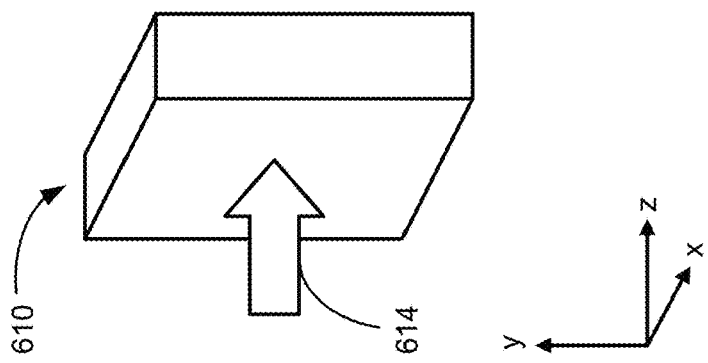

FIG. 6E illustrates a three-dimensional view of PSH lens 610 with incoming light 614 entering the lens along the z-axis. FIG. 6E illustrates an x-y plane view of PSH lens 610 with a plurality of liquid crystals (e.g., liquid crystals 612-1 and 612-2) with various orientations. The orientations (i.e., azimuthal angle θ) of the liquid crystals vary along reference line between B and B' from the center of PSH lens 610 toward the periphery of PSH lens 610. FIG. 6G illustrates an x-z-cross-sectional view of PSH lens 610. As shown in FIG. 6G, in contrast to PBP described with respect to FIG. 6C, the liquid crystals (e.g., liquid crystals 612-1 and 612-2 in FIG. 6F) of PSH lens 610 are arranged in helical structures 618. Helical structures 618 have helical axes aligned corresponding to the z-axis. As the azimuthal angle of respective liquid crystals on the x-y-plane varies, the helical structures create a volume grating with a plurality of diffraction planes (e.g., planes 620-1 and 620-2) forming cycloidal patterns. The diffraction planes (e.g., Bragg diffraction planes) defined in a volume of an PSH lens produce a periodically changing refractive index. Helical structures 618 define the polarization selectivity of PSH lens 610, as light with circular polarization handedness corresponding to the helical axis is diffracted while light with circular polarization with the opposite handedness is not diffracted. Helical structures 618 also define the wavelength selectivity of PSH lens 610, as helical pitch 622 determines which wavelength(s) are diffracted by PSH lens 610 (light with other wavelengths is not diffracted). For example, for a PSH lens, the designed wavelength for which the PSH lens will diffract the light is determined based on Equation (2):

$$\lambda = 2n_{eff}P_z \quad (2)$$

where λ denotes a wavelength of light that the PSH lens is designed for, $P_z$ is distance of helical pitch 622, and $n_{eff}$ is the effective refractive index of the liquid crystal medium that is a birefringent medium. A helical pitch refers to a distance when a helix has made a 180 degree turn along a helical axis (e.g., the z-axis in FIG. 6G). The effective refractive index of the birefringent liquid crystal medium is determined based on Equation (3):

$$n_{eff} = \sqrt{\frac{n_0^2 + 2n_e^2}{3}} \quad (3)$$

where $n_0$ is the ordinary refractive index of the birefringent medium and $n_e$ is the extraordinary refractive index of the birefringent medium.

Figure 6H:
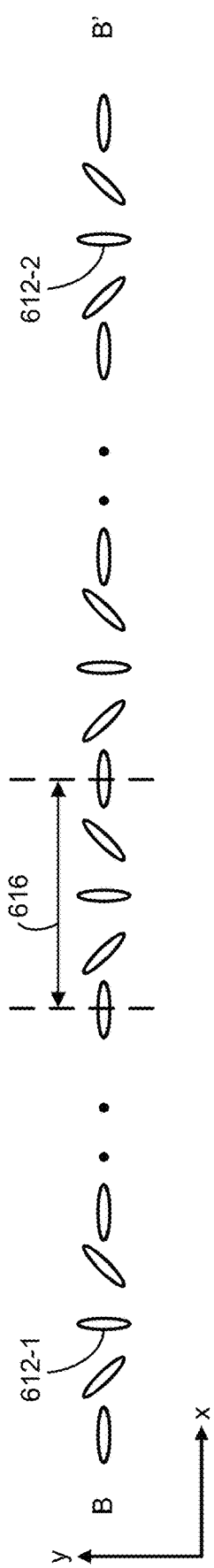

FIG. 6H illustrates a detailed plane view of the liquid crystals along the reference line between B and B' in FIG. 6F. Pitch 406 is defined as a distance along x-axis at which the azimuth angle of liquid crystal has rotated 180 degrees from the initial orientation. In some embodiments, pitch 616 varies as a function of distance from the center of PSH lens 610. In a case of a lens, the azimuthal angle of liquid crystals varies in accordance with Equation (1) shown above. In such cases, the pitch at the center of the lens is the longest and the pitch at the edge of the lens is the shortest.

Figure 7A:
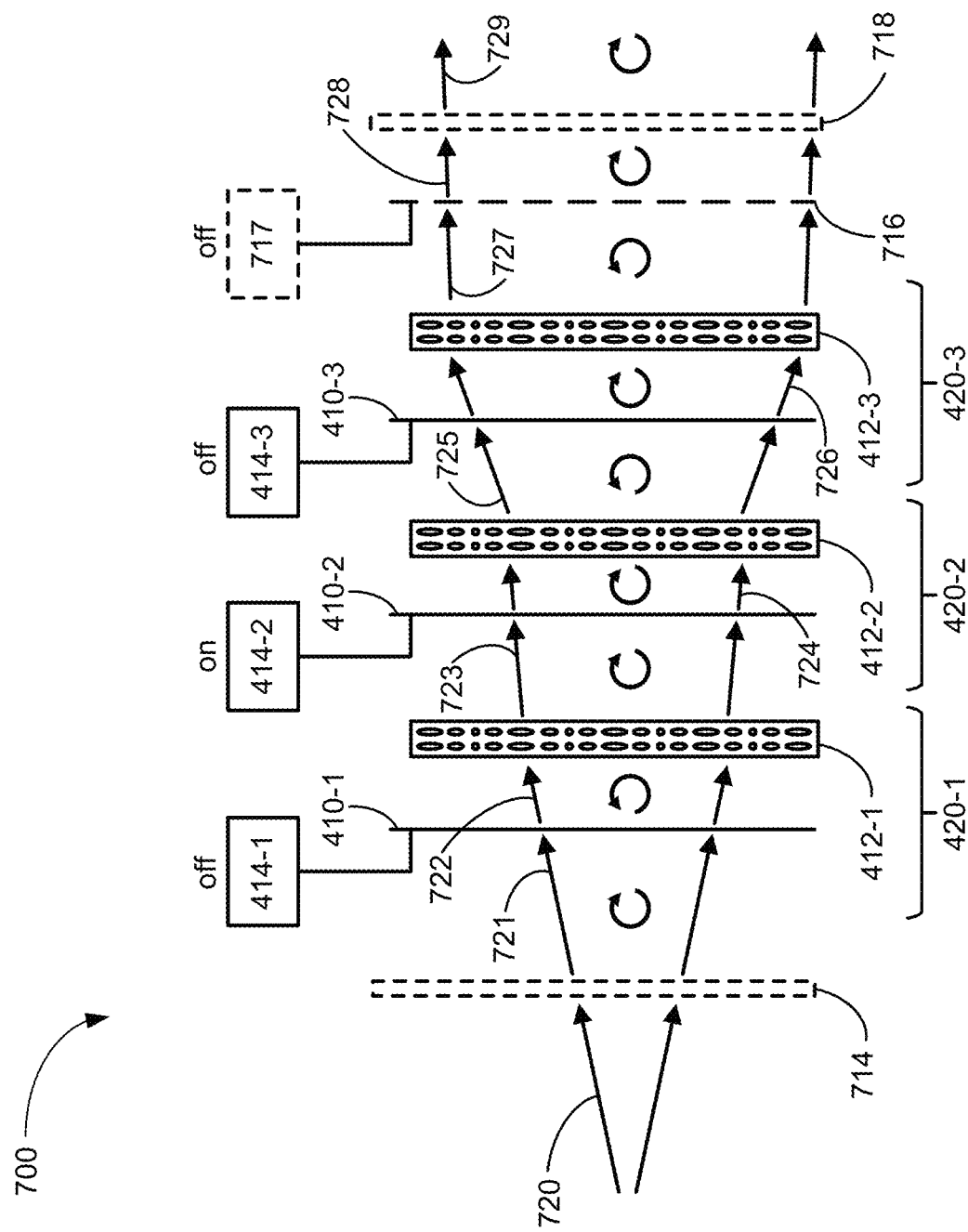
FIG. 7A illustrate optical paths of light through a varifocal optical assembly in accordance with some embodiments.

FIG. 7A illustrates optical paths of light transmitted through varifocal optical assembly 700, corresponding to varifocal optical assembly 400, in accordance with some embodiments. As shown, in this example, varifocal optical assembly 700 includes a three-stage optical stack having optical stages 420-1, 420-2, and 420-3.

The first optical stage 420-1 is configured to receive first light 721 having a first divergence. The first light is transmitted through the optical stack and output from the last optical stage 420-3 as second light 727 having a second divergence that is different from the first divergence. In some embodiments, the second divergence is less than the first divergence (e.g., the second light is more collimated than the first light)

In some embodiments, the first optical stage 420-1 is configured to receive first light 721. In this example, first optical element 410-1 of first optical stage 420-1 is in the first state. Thus, first optical element 410-1 receives first light 721 having left-circular polarization (LCP) and converts the LCP first light 721 as light 722 having right-circular polarization (RCP). Second optical element 412-1 of first optical stage 420-1 receives RCP light 722 having the first divergence and converts RCP light 722 into third light 723 having left-circular polarization (LCP) while focusing it, resulting in third light 723 having a third divergence that is smaller than the first divergence (e.g., second optical element 412-1 acts as a converging lens and thus RCP light 722 is converted into more converged LCP third light 723).

A first optical element 410-2 of a second optical stage 420-2 is in the second state. Thus, second optical element 410-2 receives LCP third light 723, output from first optical stage 420-1, and transmits LCP third light 723 as LCP light 724 without changing the polarization. Second optical element 412-2 of second optical stage 420-2 receives LCP light 724 having the third divergence and converts LCP light 724 into RCP fourth light 725 while diverging it, resulting in fourth light 725 having a fourth divergence that is larger than the third divergence (e.g., second optical element 412-2 acts as a diverging lens and thus light 724 is converted into more diverging RCP fourth light 725).

A first optical element 410-3 of a third and last optical stage 420-3 is in the first state. Thus, first optical element 410-3 receives RCP fourth light 725, output from second optical stage 420-2, and converts RCP fourth light 725 as LCP light 726. Second optical element 412-3 receives LCP light 726 having the fourth divergence and converts LCP light 726 into RCP fifth light 727 while diverging it, resulting in fifth light 727 having a fifth divergence that is smaller than the fourth divergence (e.g., second optical element 412-2 acts as a converging lens and thus light 726 is converted into more converged RCP fifth light 727). Since the third optical stage is the last optical stage in the optical stack, the fifth light 727 having the fifth divergence corresponds to (e.g., is the same as) the second light 727 having the second divergence, output from the output end of the optical stack as described above.

Thus, the additional optical stage 420-2 is configured to receive light from a previous optical stage 420-1 and transmit the light to a next optical stage such that the light output from the additional optical stage has a divergence that is different from the divergence of the light received by the optical stage. The divergence of the transmitted light is determined based on the divergence of the received light, the polarization of the received light, and a state of the first optical element of the additional optical stage.

In some embodiments, varifocal optical assembly 700 may also include a first polarizer 714 at the input side of the optical stack. In some embodiments, varifocal optical assembly 700 also includes, at the output side of the optical stack, a switchable retarder 716 that is electrically coupled to a controller 717 and a second polarizer 718. Switchable retarder 716 has optical properties that are similar to (or the same as) those of first optical element 410 described above with reference to FIGS. 4 and 5A-5H, which are therefore not repeated here for brevity. In some embodiments, switchable retarder 716 is a switchable half wave plate. As explained in FIGS. 5A-5H, operation of each optical stage of varifocal optical assembly 700 is dependent on the polarization of light incident on the optical stage. Although not shown, the optical elements in varifocal optical assembly 700 may not have 100% efficiency and thus, leakage at an optical element in varifocal optical assembly 700 may contribute to "ghosting" effects. For example, optical elements in varifocal optical assembly 700 may not exhibit perfect birefringence across a spectral range, leading to less than 100% efficiency in converting polarization. Thus, first polarizer 714 and second polarizer 718, either individually or in combination, can be used to block at least a portion of the leaked light, thereby reducing "ghosting" effects. First polarizer 714 is configured to ensure that light having only one polarization is incident upon the first optical stage 420-1 and second polarizer 718 is configured to ensure that light having only one polarization is output from varifocal optical assembly 400. As shown in FIGS. 7B and 7C, light output from the last optical stage 420-n may have a different polarization depending on the state of respective first optical elements 410 of respective optical stages 420. Thus, switchable retarder 716 is configured to transmit light output from the last optical stage 420-n such that the output light has a polarization that corresponds to (e.g., can be transmitted through) the second polarizer 718. Thus, one or more of first polarizer 714 and second polarizer 718 may be included in varifocal optical assembly 700 in order to reduce transmission of the leaked light having an undesired polarization. The leaked light corresponding to optical aberrations or distortions that may be caused by transmitting light through multiple optical stages that may have non-constant birefringence that across a spectral range of the transmitted light. Thus, depending on the uniformity of the birefringence across the spectral range of transmitted light, one or more of polarizer 714 and polarizer 718 with switchable waveplate 716 may be optional.

In some embodiments, such as when varifocal optical assembly 700 includes first polarizer 714, light 720 having the first divergence may be incident on first polarizer 714 and a portion of light 720 having undesired polarization (in this example RCP light is the undesired polarization) may be transmitted through first polarizer 714, for example due to high incident angle, as first light 721. In some embodiments, light having the undesired polarization can propagate through the optical stack. In some embodiments, the percentage of undesirable light that may be transmitted through the system may be as high as 1%. In some embodiments, the percentage of undesirable light that may be transmitted through the system may be larger than 1%. When light having the undesired polarization propagates through the optical stack, the light having the undesired polarization will have one or more optical paths and polarization evolutions that are different from the light path of light having the desired polarization. The various optical paths and polarization evolutions of the light having the undesired polarization is due to interaction of the light having the undesired polarization with the optical elements (e.g. first optical elements 410, second optical elements 412) of the optical stack. For example, the optical elements of the optical stack may have an efficiency that is less than 100% or may have a non-constant response to light of different wavelengths within a spectral range of the incident light or may have a non-constant response to incident light that are incident on the optical element at large angles. Thus, each time light interacts with a first optical element of the optical stack, a portion of the light (e.g., a portion having wavelengths towards the edges of the spectral range of a portion having large incident angles) may experience an undesired retardance (e.g., any retardance other than the designed/desired retardance) and the polarization of the portion of the light degrades from a circular polarization (e.g., LCP or RCP) to an elliptical polarization. It is undesirable to transmit light having an elliptical polarization, referred to hereafter as "elliptical light," through the optical stack since the ellipticity of the light will increase as the elliptical light is transmitted through each respective first optical element 410 of the successive optical stages 420 of the optical stack. Additionally, elliptical light incident on a second optical element 412 of the optical stack will be split between different diffractive orders resulting in "leaked light" (e.g., a first portion of the elliptical light may be diffracted to a desired $1^{st}$ diffraction order, a second portion of the elliptical light may be diffracted to an undesired $0^{th}$ diffraction order, and a third portion of the elliptical light may be diffracted to an undesired $-1^{st}$ diffraction order). Both of the phenomena described above, light accumulating an undesired retardance resulting in an elliptical polarization and light being diffracted into an undesired diffraction order, may be cumulative as the light propagates through the optical stack resulting in "ghosting effects" with multiple "ghost paths." A first portion of light that contributes to the "ghost paths" may have a polarization that is the same as the desired output polarization and will be transmitted to the user's eye along with the desired light. However, a second portion of the light that contributes to the "ghost paths" may have a polarization that is the different from (e.g., orthogonal to) the desired output polarization and can be blocked (e.g., eliminated) from reaching the user's eyes by one or more of first polarizer 716 and second polarizer 718.

For example, when varifocal optical assembly 700 includes switchable retarder 716 and controller 717, switchable retarder 716 receives light 727 that may include light having the desired polarization (for example, RCP light), referred hereafter as the "desired light," as well as light having the undesired polarization (for example, LCP light), referred hereafter as the "undesired light." In some cases, the desired light has a higher intensity than undesired light. In this example, switchable retarder 716 is in the first state and thus converts the undesired LCP light into undesired RCP light and converts desired RCP light into desired LCP light. Thus, light 728 output from switchable retarder 716 includes both desired LCP light and undesired RCP light. Second polarizer 718 is configured to receive desired LCP light and transmit the desired LCP light as light 729. Second polarizer 718 is also configured to receive undesired RCP light and to absorb the undesired RCP light, thus reducing the number of "ghost paths" that contribute to "ghosting effects."

FIGS. 7B-7C show examples of different settings of a varifocal optical assembly in accordance with some embodiments. FIGS. 7B and 7C show the optical power that light transmitted through an optical stack will acquire at each optical stage, as well as the state of a respective first optical element 410 of each optical stage. FIG. 7B shows the progression of RCP light incident on the optical stack and FIG. 7C shows the progression of LCP light incident on the optical stack. As shown, different resulting optical powers (see columns 770 and 790) can be achieved by adjusting the state of respective first optical elements 410 in the optical stack. Although specific numerical values are provided here as an example, one of ordinary skill in art can understand that different optical powers can be used and achieved without changing the principles and methods described herein.

Figure 8A:
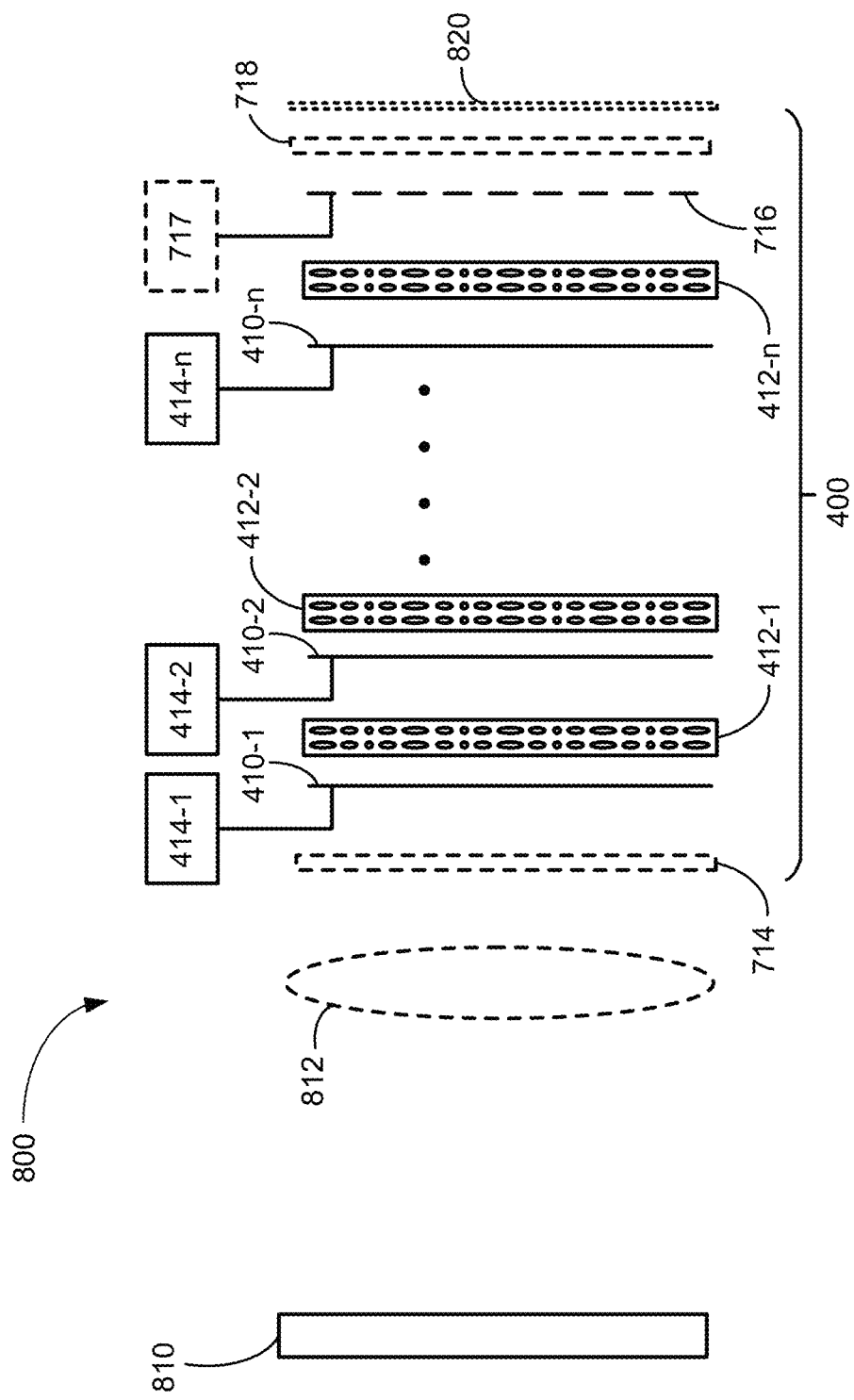
FIGS. 8A-8B illustrate a display device that includes a varifocal optical assembly in accordance with some embodiments.
Figure 8B:
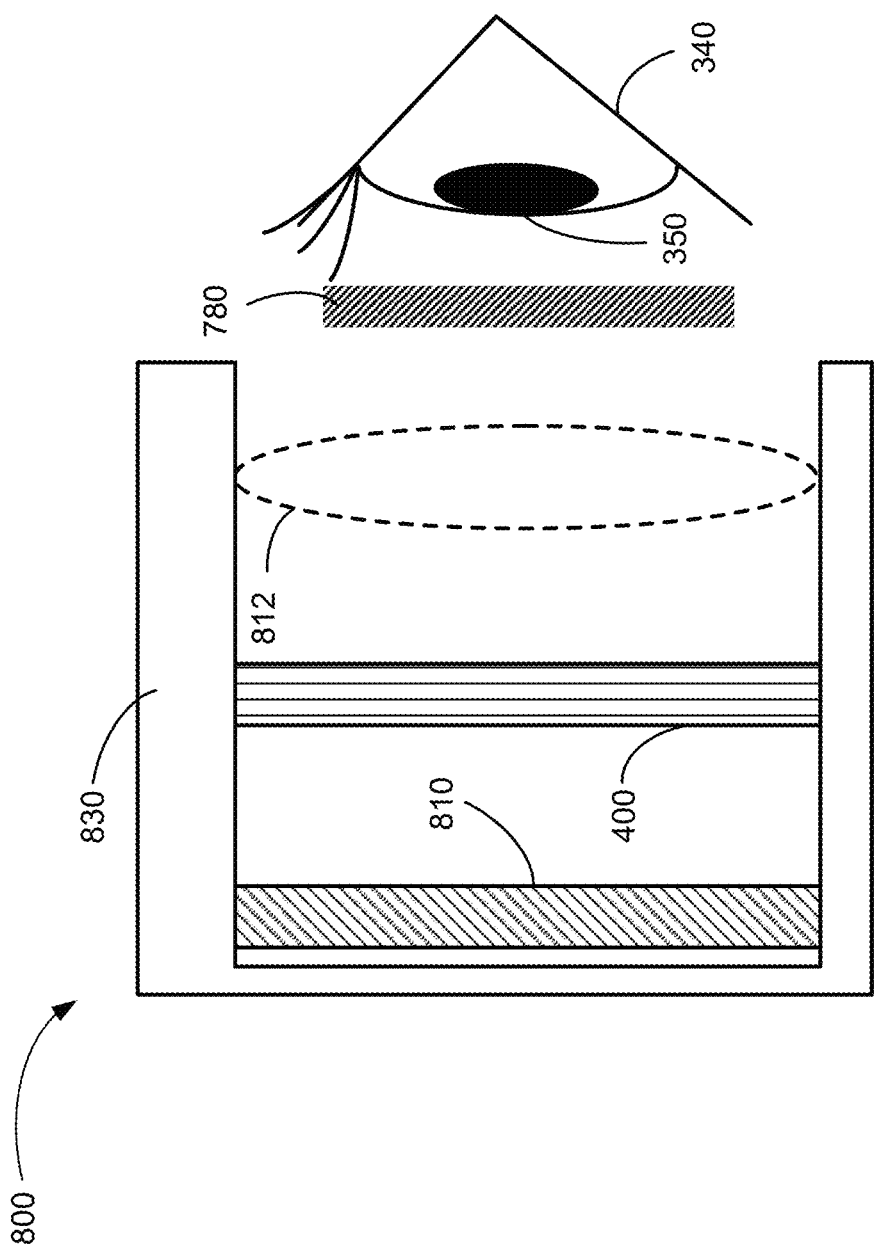

FIGS. 8A-8B illustrate a display device 800 that includes varifocal optical assembly 400 in accordance with some embodiments. As shown in FIG. 8A, display device 800 includes display 810, corresponding to display 310 and display 360, and varifocal optical assembly 400. Details regarding varifocal optical assembly 400 that are provided above with respect to FIG. 4 are not repeated here for brevity. Display 810 is configured to emit image light corresponding to one or more images toward varifocal optical assembly 400. Varifocal optical assembly 400 is configured to receive the image light emitted from display 810 and transmit the image light toward an eyebox 780 or a pupil 350 of a user's eye 340.

In some embodiments, display device 800 is a head-mounted display device. In near-eye display devices and head-mounted display devices, varifocal optical assembly 400 is located between the eyes 340 of the user and the display in order to allow the user to comfortably view images displayed by image source 410 even if the image source 410 is located outside the accommodation range of the eyes of the user.

In some embodiments, display device 800 may also include a lens assembly 812, corresponding to lens assembly 362. Lens assembly 812 may include, for example, one or more of a conventional lens, a pancake lens, a PSH optical lens, a geometric phase lens, a PBP lens, and any other optical element that has lensing (e.g., focusing) properties.

In some embodiments, as shown in FIG. 8A, lens assembly 812 may be located between display 810 and varifocal optical assembly 400. In such cases, lens assembly 812 is configured to receive image light output from display 810 and transmit the image light toward varifocal optical assembly 400. Alternatively, as shown in FIG. 8B, varifocal optical assembly 400 may be located between display 810 and lens assembly 812. In such cases, lens assembly 812 is configured to receive light output from varifocal optical assembly 400 and transmit the light toward a user's eye 340 or an eyebox 780. Lens assembly 812 may also be configured to reduce optical aberrations (e.g., distortion, pupil swim, etc).

In some embodiments, varifocal optical assembly 400 may also include an optically transparent substrate 820 that is configured to add rigidity to the optical stack. Although FIG. 8A shows optically transparent substrate 820 located at the output end of the optical stack, between the second polarizer 718 and a user's eye 340, optically transparent substrate 820 can be located anywhere varifocal optical assembly 400, including in between or adjacent to one or more optical stages without detriment or degradation to the function of the varifocal optical assembly 400. In some embodiments, one or more optically transparent substrates 820 may be located at one or more of the input end and the output end of the optical stack. In some embodiments, optically transparent substrate 820 is included in varifocal optical assembly 400 in order to reduce pupil swim. In some embodiments, pupil swim may be caused by non-rigid (e.g., wavy) film elements in the optical stack. Thus, the addition of optically transparent substrate 820 to the optical stack may increase the rigidity of the optical stack, thereby reducing pupil swim.

In some embodiments, as shown in FIG. 8B, display device 800 may be located (e.g., encased, enclosed) in a housing or frame 830 such that display device 800 is configured to be mounted near a user's eyes 340 and to operate as a head-mounted display device.

Figure 9:
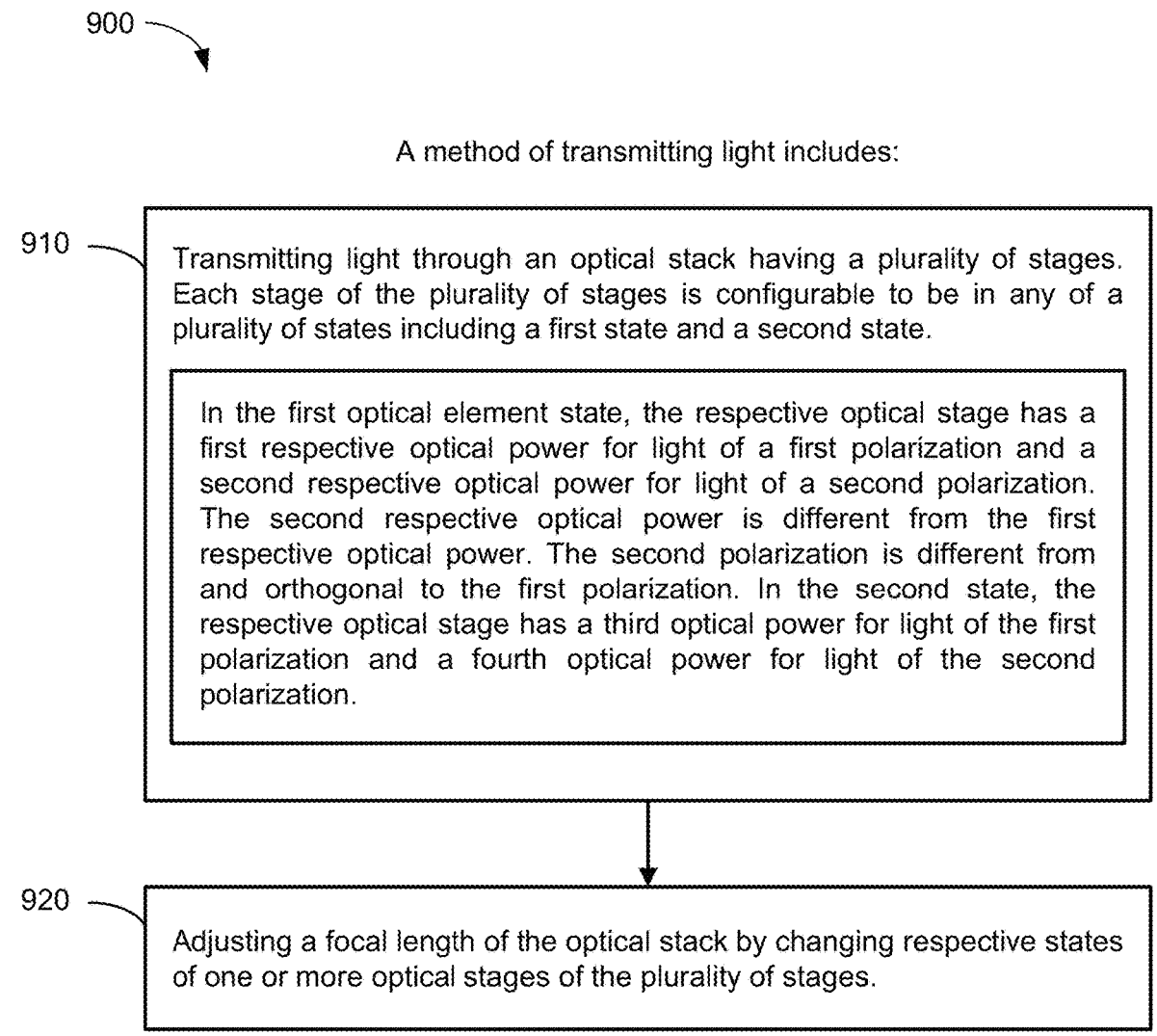
FIG. 9 illustrates a method of adjusting the focal length of light transmitted through a varifocal optical assembly in accordance with some embodiments.

FIG. 9 illustrates a method 900 of adjusting the focal length of light transmitted through a varifocal optical assembly in accordance with some embodiments.

Method 900 includes (step 910) transmitting light through an optical stack that has a plurality of stages (e.g., successive optical stages 420-1, 420-2, 420-*m*, 420-*m*). Each stage of the plurality of optical stages is configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization.

Method 900 also includes (step 920) adjusting a focal length of the optical stack by changing respective states of one or more optical stages of the plurality of optical stages.

In light of these principles, we now turn to certain embodiments of a varifocal optical assembly, a display device including the varifocal optical assembly, and a method of transmitting light through a varifocal optical assembly.

In accordance with some embodiments, an optical assembly (e.g., varifocal optical assembly 400) includes a plurality of optical elements that are configured to transmit light in successive optical stages (e.g., optical stages 420-1, 420-2, 420-*n*). Each respective optical stage of the successive optical stages includes at least one respective optical element of the plurality of optical elements and is configurable to be in any of a plurality of states including a first state and a second state. In the first state (e.g., "off" state), the respective optical stage has a first respective optical power for light of a first polarization and a second respective optical power, different from (e.g., orthogonal to) the first respective optical power, for light of a second polarization that is orthogonal to the first polarization. In the second state (e.g., "on" state), the respective optical stage has a third optical power for light of the first polarization and a fourth optical power for light of the second polarization. An overall optical power of the optical assembly is variable by configuring one or more of the successive optical stages.

In some embodiments, an optical assembly (e.g., varifocal optical assembly 400) includes a plurality of optical elements of a first type (e.g., first optical element 410) and a plurality of optical elements of a second type (e.g., second optical element 412). The optical element of the first type is configurable to be in a first state (e.g., "off" state) or a second state (e.g., "on" state). In the first state, the respective optical element of the first type converts light of a first or second polarization into light of a second or first polarization, respectively (e.g., converting LCP light to RCP light and vice versa). The first polarization is orthogonal to the second polarization. In the second state, the respective optical element of the first type transmits incident light without changing its polarization. The respective optical element of the second type is configured to receive light transmitted through the respective optical element of the first type. The respective optical element of the second type has an optical power that is dependent on whether the light transmitted through the optical element of the first type has the first polarization or the second polarization.

In some embodiments, the second respective optical power is equal (e.g., in magnitude) to and opposite (e.g., in sign) from the first respective optical power. In some embodiments, the second respective optical power is less than (e.g., in magnitude) the first respective optical power. In some embodiments, the second respective optical power is zero.

In some embodiments, the successive optical stages (e.g., optical stages 420-1, 420-2, 420-*m*, 420-*n*) form an optical stack that is configurable to receive input light (e.g., first light 721) having a first divergence and to project output light (e.g., second light 727) having a second divergence distinct from the first divergence. The second divergence is adjustable by changing the state of at least one of the successive optical stages.

In some embodiments, the second divergence is less than the first divergence.

In some embodiments, the optical stack is configurable to receive input light (e.g., first light 721) on an input side and to project output light (e.g., second light 727) on an output side. The successive optical stages include a first optical stage (e.g., first optical stage 420-1) at the input side. The first optical stage has a fifth optical power depending on the state of the first stage and a polarization of the input light.

In some embodiments, the plurality of successive optical stages includes one or more additional optical stages (e.g., optical stages 420-2, 420-*m*). Each respective optical stage of the one or more additional optical stages has a respective optical power depending on the state of the respective optical stage and the polarization of light output from an optical stage preceding the respective optical stage.

In some embodiments, light output from an optical stage preceding a respective optical stage has a third divergence. The respective optical stage is configurable to output light having a fourth divergence. The fourth divergence is determined based on the third divergence, the state of the respective optical stage, and the polarization of the light output from the optical stage preceding the respective optical stage.

In some embodiments, the optical assembly (e.g., varifocal optical assembly 400) further includes an optically transparent substrate (e.g., optically transparent substrate 820) configured to add rigidity to the optical stack.

In some embodiments, the optically transparent substrate (e.g., optically transparent substrate 820) can be located at any location in the optical assembly. In some embodiments, the optically transparent substrate may be located at one or more of the input end and the output end of the optical stack. In some embodiments, the optically transparent substrate is included in the optical stack in order to reduce pupil swim.

In some embodiments, the optical stack has an input side and an output side. The successive optical stages (e.g., optical stages 420-1, 420-2, 420-*m*, 420-*n*) includes a first stage (e.g., first stage 420-1) on the input side and a second stage (e.g., last stage 420-*n*) on the second side. The first stage is configurable to have a first optical power (e.g., a first optical power magnitude) and the second stage is configurable to have a second optical power (e.g., a second optical power magnitude). The optical stack is configured such that the first stage and the second stage have different optical powers (e.g., different optical power magnitudes).

In some embodiments, the optical stack is configured such that the second stage has a greater optical power (e.g., has a greater optical power magnitude) than the first stage. In some embodiments, the second optical power is larger than (e.g., has a magnitude that is larger than) the first optical power.

In some embodiments, the optical stack has an input side and an output side. The optical assembly (e.g., varifocal optical assembly 400) further includes a first polarizer (e.g., first polarizer 714) on the input side of the optical stack.

In some embodiments, the optical assembly (e.g., varifocal optical assembly 400) further includes a second polarizer (e.g., second polarizer 718) and a switchable retarder (e.g., switchable retarder 716). In some embodiments, the switchable retarder is disposed between the second polarizer and the output side of the optical stack.

In some embodiments, an optical element of the second type includes a thin film formed on a surface of the optical element of the first type (e.g., the second optical element 412 includes a thin film formed a surface of the first optical element 410).

In some embodiments, the optical element of the second type (e.g., second optical element 412) includes one or more of a Pancharatnam-berry-phase (PBP) lens, a polarization sensitive hologram (PSH) lens, and a liquid crystal optical phase array. In some embodiments, the optical element of the second type includes one or more of a PBP grating and a PSH grating. In some embodiments, the optical element of the second type includes a geometric-phase lens or a geometric-phase grating.

In some embodiments, one or more optical stages of the successive optical stages includes an active optical element (e.g., active second optical element 412). The active optical element is configurable to be in any of an "off" state and an "on" state. In the "off" state, the active optical element has an optical power that is dependent on whether the light incident on the active optical element has the first polarization or the second polarization. In the "on" state, the active optical element transmits light incident on the active optical element without changing polarization or direction of the incident light regardless of the polarization of the incident light.

In some embodiments, a magnitude of the optical power of any of the first optical power, the second optical power, the third optical power and the fourth optical power at any of the successive optical stages is no greater than 2.0 diopters. For example, any of the first optical power, the second optical power, the third optical power and the fourth optical power at any of the successive optical stages is between and includes −2.0 diopters and +2.0 diopters. In some embodiments, a magnitude of the optical power of a stage of the successive stages is no greater than 2.0 diopters. For example, an optical power of a stage of the successive stages is between and includes −2.0 diopters and +2.0 diopters.

In some embodiments, the overall optical power of the optical assembly is variable to be at any of at least 3 different levels. In some embodiments, when the optical assembly includes at least two stages, each stage having a different optical power, the overall optical power of the optical assembly is variable to be at any of at least 4 different levels. In some embodiments, when the optical assembly includes at least two stages, each stage having a different optical power and including an active second optical element (e.g., active PBP, active PVH, active liquid crystal optical phase array), the overall optical power of the optical assembly is variable to be at any of at least 5 different levels.

In accordance with some embodiments, a display device (e.g., display device 800) includes a display (e.g., display 810) configured to emit image light and an optical assembly (e.g., varifocal optical assembly 400) configured to transmit image light. The optical assembly includes a plurality of optical elements that are configured to transmit light in successive optical stages (e.g., optical stages 420-1, 420-2, 420-n). Each respective optical stage of the successive optical stages includes at least one respective optical element of the plurality of optical elements and is configurable to be in any of a plurality of states including a first state and a second state. In the first state (e.g., "off" state), the respective optical stage has a first respective optical power for light of a first polarization and a second respective optical power, different from (e.g., orthogonal to) the first respective optical power, for light of a second polarization that is orthogonal to the first polarization. In the second state (e.g., "on" state), the respective optical stage has a third optical power for light of the first polarization and a fourth optical power for light of the second polarization. An overall optical power of the optical assembly is variable by configuring one or more of the successive optical stages.

In some embodiments, the one or more optical stages of the successive optical stages (e.g., optical stages 420-1, 420-2, 420-m, 420-n) includes an optical element of a first type (e.g., first optical element 410) and an optical element of a second type (e.g., second optical element 412). The optical element of the first type is configurable to be in a first state (e.g., "off" state) or a second state (e.g., "on" state). In the first state, the respective optical element of the first type converts light of a first or second polarization into light of a second or first polarization, respectively (e.g., converting LCP light to RCP light and vice versa). The first polarization is orthogonal to the second polarization. In the second state, the respective optical element of the first type transmits incident light without changing its polarization. The respective optical element of the second type is configured to receive light transmitted through the respective optical element of the first type. The respective optical element of the second type has an optical power that is dependent on whether the light transmitted through the optical element of the first type has the first polarization or the second polarization.

In some embodiments, the successive optical stages (e.g., optical stages 420-1, 420-2, 420-m, 420-n) form an optical stack configurable to receive input light (e.g., light 721) having a first divergence and to project output light (e.g., light 727) having a second divergence that is distinct from the first divergence. The second divergence is adjustable by changing the state of at least one of the successive optical stages.

In some embodiments, the successive optical stages (e.g., optical stages 420-1, 420-2, 420-m, 420-n) include a first optical stage (e.g., first optical stage 420-1) at an input side of the optical stack. The first stage has a fifth optical power depending on the state of the first stage and a polarization of input light (e.g., light 721). The successive optical stages also include one or more additional optical stages (e.g., optical stages 420-2, 420-m). Each respective optical stage of the one or more additional optical stages has a respective optical power depending on the state of the respective optical stage and the polarization of light output from an optical stage preceding the respective optical stage.

In some embodiments, the display device (e.g., display device 800) also includes a lens assembly (e.g., lens assembly 812). In some embodiments, the lens assembly is located between the display (e.g., display 810) and the optical assembly (e.g., varifocal optical assembly 400) and is configured to receive image light output from the display and transmit the image light toward the optical assembly. In some embodiments, the optical assembly is located between the display and the lens assembly. In some embodiments, the lens assembly is polarization selective lens assembly that has a fourth optical power for light having a first polarization and a fifth optical power, different from the fourth optical power, for light having a polarization that is different from (e.g., orthogonal to) the first polarization. In some embodiments, the lens assembly is configured to transmit light having a specified (e.g., either the first polarization or the second polarization) toward a user's eye with a non-zero optical power.

In some embodiments, the display device (e.g., display device 800) is a head-mounted display device.

In accordance with some embodiments, a method (e.g., method 900) of transmitting light includes (e.g., step 910) transmitting light through an optical stack having a plurality of stages (e.g., successive optical stages 420-1, 420-2, **420-*m*, 420-*m***). Each stage of the plurality of optical stages is configurable to be in any of a plurality of states including a first state and a second state. In the first state, the respective optical stage has a first respective optical power for light of a first polarization and a second respective optical power, different from the first respective optical power, for light of a second polarization that is orthogonal to the first polarization. In the second state, the respective optical stage has a third optical power for light of the first polarization and a fourth optical power for light of the second polarization.

Method 900 also includes adjusting a focal length of the optical stack by changing respective states of one or more optical stages of the plurality of optical stages (e.g., step 920).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
   a plurality of optical elements configured to transmit light in successive optical stages, each respective optical stage of the successive optical stages including at least one respective optical element of the plurality of optical elements and is configurable to be in any of a plurality of states including a first state and a second state, wherein
   in the first state, the respective optical stage has a first respective optical power for light of a first polarization and a second respective optical power, different from the first respective optical power, for light of a second polarization that is orthogonal to the first polarization;
   in the second state, the respective optical stage has a third optical power for light of the first polarization and a fourth optical power for light of the second polarization; and
   an overall optical power of the optical assembly is variable by configuring one or more of the successive optical stages.

2. The optical assembly of claim 1, wherein one or more optical stages of the successive optical stages includes an optical element of a first type and an optical element of a second type, wherein:
   the optical element of the first type is configurable to be in an "off" state or an "on" state, wherein
   in the "off" state, the optical element of the first type converts light of the first or second polarization into light of the second or first polarization, respectively; and
   in the "on" state, the optical element of the first type transmits incident light without changing its polarization;
   the optical element of the second type is configured to receive light transmitted through the optical element of the first type and has an optical power that is dependent on whether the light transmitted through the optical element of the first type has the first polarization or the second polarization.

3. The optical assembly of claim 1, wherein the successive optical stages form an optical stack that is configurable to receive input light having a first divergence and to project output light having a second divergence distinct from the first divergence, the second divergence being adjustable by changing the state of at least one of the successive optical stages.

4. The optical assembly of claim 3, wherein:
   the optical stack is configurable to receive input light on an input side and to project output light on an output side;
   the successive optical stages include a first optical stage at the input side; and
   the first optical stage has a fifth optical power depending on the state of the first stage and a polarization of the input light.

5. The optical assembly of claim 4, wherein:
   the successive optical stages include one or more additional optical stages; and
   each respective optical stage of the one or more additional optical stages has a respective optical power depending on the state of the respective stage and the polarization of light output from a stage preceding the respective stage.

6. The optical assembly of claim 5, wherein:
   the light output from the optical stage preceding the respective optical stage has a third divergence;
   the respective optical stage is configurable to output light having a fourth divergence; and
   the fourth divergence is determined based on the third divergence, the state of the respective optical stage, and the polarization of the light output from the optical stage preceding the respective optical stage.

7. The optical assembly of claim 3, further comprising an optically transparent substrate configured to add rigidity to the optical stack.

8. The optical assembly of claim 3, wherein:
the optical stack has an input side and an output side; and
the successive optical stages include a first stage on the input side and a second stage on the output side;
the first stage is configurable to have a first optical power;
the second stage is configurable to have a second optical power; and
the optical stack is configured such that the first stage and the second stage have different optical powers.

9. The optical assembly of claim 8, wherein the optical stack is configured such that the second stage has greater optical power than the first stage.

10. The optical assembly of claim 3, wherein the optical stack has an input side and an output side, the optical assembly further comprising a first polarizer on the input side of the optical stack.

11. The optical assembly of claim 10, further comprising:
a second polarizer; and
a switchable retarder disposed between the second polarizer and the output side of the optical stack.

12. The optical assembly of claim 2, wherein the optical element of the second type includes a thin film formed on a surface of the optical element of the first type.

13. The optical assembly of claim 2, wherein the optical element of the second type includes one or more of a Pancharatnam-berry-phase lens, a polarization sensitive hologram lens, and a liquid crystal optical phase array.

14. The optical assembly of claim 1, wherein one or more optical stages of the successive optical stages includes an active optical element, wherein:
the active optical element is configurable to be in any of an "off" state or an "on" state, wherein
in the "off" state, the active optical element has an optical power that is dependent on whether light incident on the active optical element of has the first polarization or the second polarization; and
in the "on" state, the active optical element transmits light incident on the active optical element without changing polarization or direction of the incident light.

15. The optical assembly of claim 1, wherein:
a magnitude of any of the first optical power, the second optical power, the third optical power and the fourth optical power at any of the successive optical stages is no greater than 2.0 diopters; and
the overall optical power of the optical assembly is variable to be at any of at least 3 different levels.

16. A display device, comprising:
a display configured to emit image light; and
an optical assembly configured to transmit image light, wherein the optical assembly includes:
a plurality of optical elements configured to transmit light in successive optical stages, each respective optical stage of the successive optical stages including at least one respective optical element of the plurality of optical elements and is configurable to be in any of a plurality of states including a first state and a second state, and wherein
in the first state, the respective optical stage has a first respective optical power for light of a first polarization and a second respective optical power, different from the first respective optical power, for light of a second polarization that is orthogonal to the first polarization;
in the second state, the respective optical stage has a third optical power for light of the first polarization and a fourth optical power for light of the second polarization; and
an overall optical power of the optical assembly is variable by configuring one or more of the successive optical stages.

17. The display device of claim 16, wherein one or more optical stages of the successive optical stages includes an optical element of a first type and an optical element of a second type, wherein:
the optical element of the first type is configurable to be in an "off" state or an "on" state, wherein
in the "off" state, the optical element of the first type converts light of the first or second polarization into light of the second or first polarization, respectively; and
in the "on" state, the optical element of the first type transmits incident light without changing its polarization;
the optical element of the second type is configured to receive light transmitted through the optical element of the first type and has an optical power that is dependent on whether the light transmitted through the optical element of the first type has the first polarization or the second polarization.

18. The display device of claim 16, wherein:
the successive optical stages form an optical stack that is configurable to receive input light having a first divergence and to project output light having a second divergence distinct from the first divergence, the second divergence being adjustable by changing the state of at least one of the successive optical stages.

19. The display device of claim 18, wherein:
the successive optical stages include a first optical stage at the input side of the optical stack and one or more additional optical stages;
the first optical stage has a fifth optical power depending on the state of the first stage and a polarization of the input light; and
each respective optical stage of the one or more additional optical stages has a respective optical power depending on the state of the respective optical stage and the polarization of light output from an optical stage preceding the respective optical stage.

20. A method of transmitting light, the method comprising:
transmitting light through an optical stack having a plurality of optical stages, each stage of the plurality of optical stages is configurable to be in any of a plurality of states including a first state and a second state;
adjusting a focal length of the optical stack by changing respective states of one or more optical stages of the plurality of optical stages; wherein:
in the first state, the respective optical stage has a first respective optical power for light of a first polarization and a second respective optical power, different from the first respective optical power, for light of a second polarization that is orthogonal to the first polarization;
in the second state, the respective optical stage has a third optical power for light of the first polarization and a fourth optical power for light of the second polarization.

* * * * *